(12) United States Patent
Kim et al.

(10) Patent No.: US 12,553,882 B2
(45) Date of Patent: Feb. 17, 2026

(54) USE OF PAK4 AND CRTC1 FOR TREATMENT OR DIAGNOSIS OF BRAIN DEGENERATIVE DISEASE

(71) Applicant: CHUNGBUK NATIONAL UNIVERSITY INDUSTRY-ACADEMIC COOPERATION FOUNDATION, Cheongju-si (KR)

(72) Inventors: Eung Gook Kim, Cheongju-si (KR); So Yoon Won, Cheongju-si (KR); Eun Young Shin, Cheongju-si (KR)

(73) Assignee: Chungbuk National University Industry-Academic Cooperation Foundation, Cheongju-si (KR)

(*) Notice: Subject to any disclaimer, the term of this patent is extended or adjusted under 35 U.S.C. 154(b) by 779 days.

(21) Appl. No.: 17/893,019

(22) Filed: Aug. 22, 2022

(65) Prior Publication Data

US 2023/0003714 A1    Jan. 5, 2023

Related U.S. Application Data

(63) Continuation of application No. 15/824,273, filed on Nov. 28, 2017, now abandoned.

(30) Foreign Application Priority Data

Jul. 13, 2017 (KR) ........................ 10-2017-0089113

(51) Int. Cl.
   *G01N 33/50* (2006.01)
   *G01N 33/53* (2006.01)
   *G01N 33/68* (2006.01)

(52) U.S. Cl.
   CPC ..... *G01N 33/5008* (2013.01); *G01N 33/5058* (2013.01); *G01N 33/5088* (2013.01); *G01N 33/53* (2013.01); *G01N 33/6812* (2013.01); *G01N 2800/2835* (2013.01); *G01N 2800/52* (2013.01); *G01N 2800/56* (2013.01)

(58) Field of Classification Search
   CPC .......... G01N 33/5008; G01N 33/5058; G01N 33/5088; G01N 33/53; G01N 33/6812; G01N 2800/2835; G01N 2800/52; G01N 2800/56; G01N 33/5044; G01N 33/6896; G01N 2440/14; A61K 38/16; A61K 39/395; A61K 48/005
   See application file for complete search history.

(56) References Cited

U.S. PATENT DOCUMENTS

2019/0017997 A1   1/2019   Kim et al.

OTHER PUBLICATIONS

KR Application No. 10-2017-0089113, Office Action (with English translation), Sep. 19, 2017, 11 pages.
Parra-Damas, Arnaldo et al., "Crtc1 Activates a Transcriptional Program Deregulated at Early Alzheimer's Disease-Related Stages," The Journal of Neuroscience, Apr. 23, 2014, 34(17):5776-5787.
Won, So-Yoon et al., Abstract: "Role for PAK5 in neurodegenerative diseases," Presentation of MRC Achievement, 2014, 3 pages.
NCBI Reference Sequence: NP_005875.1, "serine/threonine-protein kinase PAK 4 isoform 1 [*Homo sapiens*]", 3 pages.
Study: Support of New Researchers, 2014, Increase of dopamine synthesis and recovery of function by p21-actiavated kinase 4 (PAK4) activity in an animal model of Parkinson's disease, basic information and abstract: Chunbuk University, 2015, 6 pages.
Stapleton et al., Immunoassays, Production of Antibodies. From Polyclonal Antibodies. Polyclonal antibodies (pAb) are widely used in immunosensor-based assays for pathogen detection. From: Advances in Clinical Chemistry, 2020.
Alberts et al., Molecular Biology of the Cell, Third Edition, 1994, Garland Publishing, Inc., New York & London, pp. 1216-1220.
Oertel WH, Recent advances in treating Parkinson's disease, F1000Res., Mar. 13, 2017, 6:260, doi: 10.12688/f1000research.10100.1. eCollection 2017.
Won et al., Nigral dopaminergic, PAK4 prevents neurodegeneration in rat models of Parkinson's disease, Sci Transl Med, Nov. 30, 2016;8(367)ra170.
Won et al., PAK4 confer neuroprotection in PD through CRTC1, Neurodegenerative Diseases, Mar. 2015, vol. 15, Supp., SUPPL. 1, p. 1768, Abstract No. ADPD5-1585, 12th International Conference Alzheimer's and Parkinson's Diseases, AD/PD 2015; Nice, France, Mar. 18, 2015-Mar. 22, 2015, ISSN: 1660-2854, DOI: 10.1159/0003.
U.S. Appl. No. 15/824,273, filed Oct. 4, 2018, Requirement for Restriction, 8 pages.
U.S. Appl. No. 15/824,273, filed Dec. 31, 2018, Non-Final Rejection, 13 pages.
U.S. Appl. No. 15/824,273, filed Aug. 8, 2019, Final Rejection, 17 pages.

(Continued)

*Primary Examiner* — Kimberly Ballard
*Assistant Examiner* — Stacey N Macfarlane
(74) *Attorney, Agent, or Firm* — Kilpatrick Townsend & Stockton LLP

(57) ABSTRACT

The present invention relates to use of PAK4 and CRTC1 or the treatment or diagnosis of a degenerative brain disease. Specifically, the present invention relates to a pharmaceutical composition for the prevention or treatment of a degenerative brain disease comprising PAK4 (p21-activated kinase 4) or a PAK4 activator as an effective ingredient. In addition, the present invention relates to a pharmaceutical composition for the prevention or treatment of a degenerative brain disease comprising a CRTC1 expression enhancer or activator as an effective ingredient, a diagnostic kit for a degenerative brain disease comprising an agent for detecting CRTC1, and a method for screening a substance for the prevention or treatment of a degenerative brain disease, comprising (a) applying a candidate drug to brain tissue or brain cells containing CRTC1 gene or CRTC1 protein; (b) measuring the degree of phosphorylation in CRTC1; and (c) determining the candidate drug as a substance for the prevention or treatment of a degenerative brain disease when the measurement in step (b) indicates that the phosphorylation in CRTC1 is increased.

1 Claim, 10 Drawing Sheets

Specification includes a Sequence Listing.

(56) References Cited

OTHER PUBLICATIONS

U.S. Appl. No. 15/824,273, filed Apr. 2, 2020, Non-Final Rejection, 10 pages.
U.S. Appl. No. 15/824,273, filed Oct. 15, 2020, Final Rejection, 7 pages.
U.S. Appl. No. 15/824,273, filed Apr. 15, 2021, Non-Final Rejection, 7 pages.
U.S. Appl. No. 15/824,273, filed Dec. 22, 2021, Final Rejection, 10 pages.

USE OF PAK4 AND CRTC1 FOR TREATMENT OR DIAGNOSIS OF BRAIN DEGENERATIVE DISEASE

CROSS-REFERENCE TO RELATED APPLICATIONS

The present application is a continuation of U.S. patent application Ser. No. 15/824,273 filed Nov. 28, 2017, which is an application claiming foreign priority under 35 U.S.C. § 119 to Korean Application No. 10-2017-0089113 filed Jul. 13, 2017, which are incorporated herein by reference in their entirety.

REFERENCE TO A SEQUENCE LISTING

A Sequence Listing conforming to the rules of WIPO Standard ST.26 is incorporated herein by reference in its entirety. The electronic Sequence Listing file, entitled 106160-000200US_1345184_ST26.xml, was created on Sep. 6, 2022, and is 15,920 bytes in size.

BACKGROUND OF THE INVENTION

(a) Field of the Invention

The present invention relates to use of PAK4 and CRTC1 for the treatment or diagnosis of a degenerative brain disease.

(b) Description of the Related Art

A degenerative brain disease refers to a disease that occurs in the brain among other degenerative diseases occurring with age, and may be classified according to main symptoms and affected brain areas. It typically includes Alzheimer's disease or Parkinson's disease, or the like. A degenerative brain disease is known to be caused by neuronal death resulting from protein aggregation due to age-related neurodegeneration and other genetic/environmental factors. However, the exact cause thereof has not yet been found, and basic researches are being actively conducted to identify the cause.

Along with Alzheimer's disease, Parkinson's disease is one of the typical degenerative neurological diseases occurring in old age. It affects about 1% of the population aged 65 years and its incident rate increases with age. Symptoms of Parkinson's disease may be largely divided into primary symptoms and secondary symptoms. Primary symptoms refer to direct phenomena generated due to neuronal destruction in substantia nigra and include stiffness, tremors, slow or diminished movement, postural imbalance and gait disorders. Secondary symptoms refer to symptoms that arise from primary symptoms or are caused by other affected nervous systems rather than substantia nigra.

As for therapies currently used for treating Parkinson's disease, there are a drug therapy, a surgical therapy, a physical therapy, and the like. In the case of the drug therapy, in general, use is made of drugs for replenishing dopamine which is deficient in the brain, for correcting imbalance of neurotransmitters due to deficiency of dopamine, for preventing or delaying neuronal destruction, and for controlling other symptoms such as depression, and the like. Examples thereof include amantadine, an anticholinergic drug, L-dopa, Sinemet, Madopar, a dopamine agonist, Elderpyrl, an antidepressant, and the like. However, since these drugs are incapable of reviving dead neurons, there are limitations that they are not intended for complete recovery but for control of symptoms. In addition, side effects of drugs may cause problems with long-term administration.

Accordingly, there is a need to identify the underlying cause of a degenerative brain disease and to develop a new therapeutic agent capable of blocking the cause of disease, not intended for improving symptoms, thereby exhibiting an effective therapeutic effect.

On the other hand, PAK (p21-activated kinase) is an important regulator involved in various cellular processes. PAK may be divided into two groups, Group I consisting of PAKs 1 to 3 and Group II consisting of PAKs 4 to 6. Among PAK isoforms, PAK4 is known to play an important role in the rearrangement of actin cytoskeleton, thereby having a great influence on the morphology and motility of cells. PAK4 is also known to mediate the antiapoptotic effect of keratinocyte growth factor. In addition, the expression of PAK4 is suppressed, it is known that signal transduction involved in cell survival is suppressed and thus death of HeLa cells by TNF-α is promoted. Further, it has been found that in mice in which PAK4 gene is deficient, embryonic development does not normally occur and mice are dead at an embryonic development stage. However, the specific action mechanism and role of PAK4 on a degenerative brain disease have not been elucidated yet.

While studying the role of PAK4 in the pathogenesis of a degenerative brain disease, the present inventors have found that activation of PAK4 by phosphorylation phosphorylates the serine 215 residue in CRTC1 and enhances the activity of the transcription factor CREB so that the expression of brain cell protective factors is promoted, thereby ameliorating, preventing and treating symptoms of a degenerative brain disease. Based on this finding, the present inventors have completed the present invention.

CITATION LIST

Patent Literature

Patent Literature 1: Korean Laid-open Patent Publication 10-2017-0036929

SUMMARY OF THE INVENTION

Accordingly, an object of the present invention is to provide a pharmaceutical composition for the prevention or treatment of a degenerative brain disease including PAK4 (p21-activated kinase 4) or a PAK4 activator as an effective ingredient.

Another object of the present invention is to provide a pharmaceutical composition for the prevention or treatment of a degenerative brain disease including a CRTC1 ((cyclic adenosine 3',5'-monophosphate response element-binding protein) regulated transcription coactivator 1) expression enhancer or activator as an effective ingredient.

A further object of the present invention is to provide a diagnostic kit for a degenerative brain disease including an agent for detecting CRTC1 ((cyclic adenosine 3',5'-monophosphate response element-binding protein) regulated transcription coactivator 1).

A still further object of the present invention is to provide a method for screening a substance for the prevention or treatment of a degenerative brain disease In order to achieve the above objects, the present invention provides a pharmaceutical composition for the prevention or treatment of a degenerative brain disease including PAK4 (p21-activated kinase 4) or a PAK4 activator as an effective ingredient.

In one embodiment of the present invention, PAK4 (p21-activated kinase 4) consists of the amino acid sequence of SEQ ID NO: 1, and the PAK4 activator may be a protein, compound or probe capable of enhancing the expression or activity of PAK4.

In one embodiment of the present invention, PAK4 (p21-activated kinase 4) may be one in which a gene encoding the PAK4 amino acid sequence of SEQ ID NO: 1 is inserted into an expression vector.

In addition, the present invention provides a pharmaceutical composition for the prevention or treatment of a degenerative brain disease including a CRTC1 ((cyclic adenosine 3',5'-monophosphate response element-binding protein) regulated transcription coactivator 1) expression enhancer or activator as an effective ingredient.

In one embodiment of the present invention, CRTC1 consists of the amino acid sequence of SEQ ID NO: 3, and the CRTC1 expression enhancer or activator may be one which increases the expression or activity of CRTC1 in brain tissue, thereby increasing the expression or activity of CREB (cyclic adenosine 3',5'-monophosphate response element-binding protein).

In one embodiment of the present invention, the CRTC1 expression enhancer or activator may be a compound, a peptide, a probe, or an antibody.

In one embodiment of the present invention, the CRTC1 expression enhancer or activator may be one which phosphorylates the serine 215 residue in the CRTC1 amino acid sequence of SEQ ID NO: 3.

In one embodiment of the present invention, the degenerative brain disease may be one selected from the group consisting of Alzheimer's disease, Parkinson's disease, Huntington's disease, Lou Gehrig's disease, Niemann-Pick disease, and stroke.

In addition, the present invention provides a diagnostic kit for a degenerative brain disease including an agent for detecting CRTC1 ((cyclic adenosine 3',5'-monophosphate response element-binding protein) regulated transcription coactivator 1).

In one embodiment of the present invention, the agent may be a compound, peptide, probe or antibody, specific for CRTC1.

Furthermore, the present invention provides a method for screening a substance for the prevention or treatment of a degenerative brain disease, comprising (a) applying a candidate drug to brain tissue or brain cells containing CRTC1 gene or CRTC1 protein; (b) measuring the degree of phosphorylation in CRTC1; and (c) determining the candidate drug as a substance for the prevention or treatment of a degenerative brain disease when the measurement in step (b) indicates that the phosphorylation in CRTC1 is increased.

In one embodiment of the present invention, the CRTC1 phosphorylation in step (b) may be phosphorylation on the serine 215 residue in the CRTC1 amino acid sequence of SEQ ID NO: 3.

In one embodiment of the present invention, the measurement in step (c) may be performed using one selected from the group consisting of Western blot, immunoprecipitation assay, enzyme linked immunosorbent assay (ELISA), radioimmunoassay (RIA), and immunohistochemical analysis.

In one embodiment of the present invention, the degenerative brain disease may be one selected from the group consisting of Alzheimer's disease, Parkinson's disease, Huntington's disease, Lou Gehrig's disease, Niemann-Pick disease, and stroke.

The present invention relates to use of PAK4 and CRTC1, and more specifically, to pharmaceutical compositions for the prevention or treatment of a degenerative brain disease including PAK4 (p21-activated kinase 4) or a CRTC1 activator as an effective ingredient, diagnostic kits and methods for screening a therapeutic drug. In the present invention, it has been found that when PAK4 has increased protein level and has increased activity by phosphorylation, it is possible to suppress dopaminergic neuronal death in a degenerative brain disease and to ameliorate abnormal behavioral symptoms. In addition, it has been found that activation of PAK4 specifically phosphorylates the serine 215 residue in CRTC1 and promotes the activity of the transcription factor CREB so that the expression of brain cell protective factors is increased, thereby ultimately preventing or treating symptoms of a degenerative brain disease. Accordingly, PAK4 or a CRTC1 expression or activator can be developed as a new therapeutic agent for a degenerative brain disease.

BRIEF DESCRIPTION OF THE DRAWINGS

FIG. 6 shows the results of analysis for the cytoprotective activity of caPAK4 in an animal model of Parkinson's disease induced with α-synuclein. A represents the experimental schedule. B represents the results where the images of TH in the SN and the striatum were checked by immunostaining, after injection of AAV-α synuclein followed by injection of lentiviral-control and lentiviral-caPAK4. C is the results obtained by quantitatively analyzing the number of Nissl-stained and TH-positive DA neurons. D is the results where TH positive images in the striatum were checked by immunostaining. E is a graph obtained by quantifying the density of TH-positive striatal fibers. F represents the results of analysis for ipsilateral rotation. G represents the results of cylinder test.

DETAILED DESCRIPTION OF THE EMBODIMENTS

Figure 1:
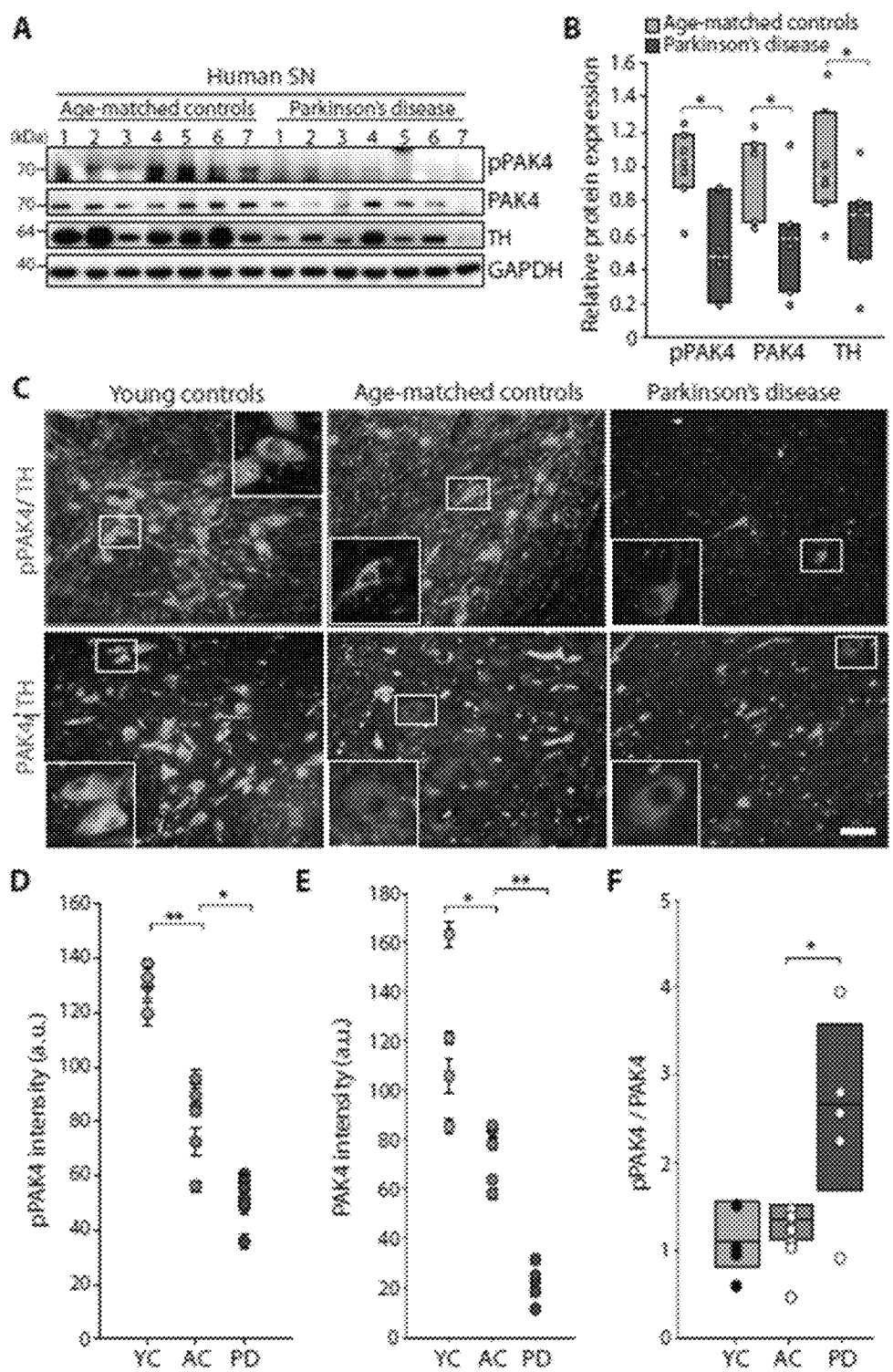
FIG. 1 shows the results of analysis for the effect of PAK4 activity (PAK4 expression level and PAK4 phosphorylation level) on the survival of DA neurons. A represents the results where the expression of PAK4 and the degree of phosphorylation of PAK4 were checked by Western blot for the samples (substantia nigra lysates) derived from a normal group and patients with Parkinson's disease. B is a graph obtained by quantitatively analyzing the results in A. C is the results where the location and the expression level of each protein were checked with a confocal microscope; pPAK4 is indicated in red, and PAK4 is indicated in green. D and E are graphs obtained by quantifying the degree of staining for pPAK4 and PAK4, respectively, in DA neurons. F represents the ratio of pPAK4/PAK4 in DA neurons, wherein the following abbreviations are used: YC: young control, AC: age-matched control, PD: PD patient.

The present invention provides a novel use of PAK4 (p21-activated kinase 4) and CRTC1 ((cyclic adenosine 3',5'-monophosphate response element-binding protein) regulated transcription coactivator 1), capable of preventing or treating a degenerative brain disease.

Specifically, the present invention provides a pharmaceutical composition for the prevention or treatment of a degenerative brain disease including PAK4 (p21-activated kinase 4) or a PAK4 activator as an effective ingredient.

As described above in the section 'BACKGROUND OF THE INVENTION,' PAK4 belongs to Group II (PAK4 to PAK6) among the PAK groups, and studies on its specific role and action in cells have not been made yet.

It is only known that PAK is involved in cell proliferation, transformation, cell migration, and neovascularization.

Thus, analysis on relevance of PAK4 with a degenerative brain disease was made in the present invention. According to one embodiment of the present invention, it has been found that PAK4 is expressed in human dopaminergic neurons (DA), and is not expressed in microglia and astrocytes. Therefore, it was predictable that PAK4 plays a particular role in dopaminergic neurons in the brain.

In addition, according to one embodiment of the present invention, the expression level of PAK4 and the expression level of phosphorylated PAK4 were analyzed for brain tissues obtained from patients with Parkinson's disease and controls. As a result, it has been shown that both expressions of PAK4 and phosphorylated PAK4 in dopaminergic neurons (DA) of the patient group were decreased compared to the normal control group.

Also, in order to analyze the effect of PAK4 activity, that is, phosphorylated-PAK4 (p-PAK4) on dopaminergic neurons (DA), p-PAK4 and Bcl-2 (anti-apoptotic member) were identified by co-staining for p-PAK4 positive neurons and p-PAK4 negative neurons among neurons derived from patients with Parkinson's disease. As a result, it has been shown that in the p-PAK4 positive neurons, anti-apoptotic member Bcl-2 was expressed and stained, and TUNEL staining, which indicates apoptosis, was negative; whereas in the p-PAK4 negative neurons, Bcl-2 was not stained, and TUNEL staining, which indicates apoptosis, was positive.

In other words, from these results, it has been found that activation of PAK4 may play a major role in apoptosis of dopaminergic neurons in the brain.

Furthermore, in order to more clearly analyze the function of PAK4 in the development of a degenerative brain disease, the present inventors performed measurements for the expression level of p-PAK4 in an animal model of Parkinson's disease induced by injecting 6-OHDA into rats to result in damage and loss of dopaminergic neurons in the substantia nigra (SN). As a result, it has been shown that phosphorylation of PAK4 was reduced compared to the control.

Besides, analysis of actions of PAK4 on Parkinson's disease was performed through loss-of-function and gain-of-function, wherein shRNA PAK4, which suppresses PAK4 expression, was injected into the right striatum in the rat brain using lentivirus, and its migration pathway was checked. As a result, it has been found that shRNA PAK4 was well transferred by lentivirus to TH-positive dopaminergic neurons, thereby effectively suppressing the expression of PAK4. It has been also shown that upon suppression of PAK4, the cell number and survival rate of dopaminergic neurons in the brain was suppressed.

On the other hand, for the gain-of-function analysis, a group into which shRNA PAK4 had been introduced was treated with the active mutant caPAK4 (PAK4$^{S445N}$; one which was mutated at the catalytic domain so that the activity of PAK4 is sustained, and PAK4$^{S474E}$; the mutant which was autophosphorylated at the S474 site to maintain the activity), in which the activity of PAK4 is constitutively maintained. As a result, it has been shown that the shRNA-reduced PAK4 activity was restored by the treatment with caPAK4, thereby decreasing the neurocytotoxicity in the brain caused by 6-OHDA.

Therefore, from the results as described above, the present inventors have found that PAK4 is a new therapeutic target capable of preventing and treating a degenerative brain disease, and that a composition including PAK4 (p21-activated kinase 4) or a PAK4 activator as an effective ingredient is usable as a pharmaceutical composition for the prevention or treatment of a degenerative brain disease.

In the present invention, PAK4 (p21-activated kinase 4) may be one having the amino acid sequence of SEQ ID NO: 1, and the amino acid may be one encoded by the base sequence of SEQ ID NO: 2.

In addition, the PAK4 activator may enhance the expression or activity of PAK4, and may include, but not limited thereto, a protein, compound or probe specific for PAK4.

Meanwhile, the present inventors have found that enhanced expression of PAK4 or activation of phosphorylated PAK4 can ameliorate, prevent and treat the symptoms with development of a degenerative brain disease, and then, have found that while studying the disease-related mechanism of PAK4, activated PAK4 allows CRTC1 to be activated.

CRTCs are known to be involved in glucose metabolism as an auxiliary activator of CREB (cyclic adenosine 3',5'-monophosphate response element-binding protein), and it has been found that there are three isoforms, CRTC1, CRTC2 and CRTC3. In addition, CREB is a factor which binds to a specific DNA base sequence and regulates the transcription of several genes. Activated CREB binds to the CRE region to invoke CBP (CREB binding protein), through which regulates the activity of a specific gene, and thus functions to regulate the expression of intracellular factors which are very important for cell proliferation, differentiation and survival. Particularly, CREB is known to regulate genes related to various functions such as memory, development, maintenance of cell survival, and bio-clock in the brain. However, there remains many aspects to be elucidated regarding how to select a specific group of genes and express site-specific functions in each area of the brain.

In one embodiment of the present invention, it has been found that PAK4 is capable of suppressing cell damage and apoptosis of dopaminergic neurons caused by induction of a degenerative brain disease, and it has been identified that activated PAK4 serves to enhance the expression and activity of CRTC1. It has been shown that in the neuronal cell line, SH-SY5Y cell line, the expression of caPAK4 enhances CRE reporter activity, and the 6-OHDA-reduced expression of the CREB target proteins, PGC-1a, BDNF and Bcl-2, is increased again.

In addition, experiments were conducted to check whether the brain cell protective activity of PAK4 is CRTC1-dependent. It has been shown that in a group where CRTC1 was suppressed with siRNA, the CRE reporter activity by caPAK4 is decreased, and in SH-SY5Y cell line, cytotoxicity caused by 6-OHDA is not suppressed or reduced.

Therefore, it has been shown that the brain cell protective activity of PAK4 is exerted dependent on CRTC1, and that activation of CRTC1 increases the reporter activity of CREB, and thus induces the expression of brain cell protective factors, thereby preventing, ameliorating and treating a degenerative brain disease.

Accordingly, the present invention provides a pharmaceutical composition for the prevention or treatment of a degenerative brain disease including a CRTC1 (CREB-regulated transcription coactivator 1) expression enhancer or activator as an effective ingredient.

CRTC1 of the present invention consists of the amino acid sequence of SEQ ID NO: 3, and the amino acid is encoded by the base sequence of SEQ ID NO: 4.

The CRTC1 expression enhancer or activator may be a substance capable of enhancing CRTC1 expression or increasing CRTC1 activity, and may include, but not limited thereto, a compound, a peptide, an aptamer or an antibody, and may be preferably an agent that phosphorylates the Serine 215 residue in the CRTC1 amino acid sequence of SEQ ID NO: 3.

In the present invention, as a result of investigation on the location of CRTC1 in DA neurons, it has been found that CRTC1 is located in the nucleus and is co-located with PAK4. As a result of analysis of their interaction, it has been shown that the substrate of PAK4, a phosphorylating protein, is CRTC1. Then, further studies were made to check which site in CRTC1 is phosphorylated by PAK4 to induce the brain cell protective activity. As a result, it has been shown that the brain cell protective activity is induced in the case where the serine 215 residue in CRTC1 is specifically phosphorylated, and thus it has been ultimately identified that a degenerative brain disease can be prevented, ameliorated and treated through the process of PAK4-CRTC1$^{S215}$-CREB activation.

The pharmaceutical composition according to the present invention may further contain a pharmaceutically acceptable carrier in addition to the effective ingredient. The carrier is commonly used at the time of formulation, and includes, but not limited thereto, lactose, dextrose, sucrose, sorbitol, mannitol, starch, acacia gum, calcium, phosphate, alginate, gelatin, calcium silicate, microcrystalline cellulose, polyvinyl pyrrolidone, cellulose, water, syrup, methyl cellulose, methylhydroxybenzoate, propylhydroxybenzoate, talc, magnesium stearate, mineral oil, and the like. In addition to the above components, the pharmaceutical composition of the present invention may further contain a lubricating agent, a wetting agent, a sweetener, a flavoring agent, an emulsifying agent, a suspending agent, a preservative, and the like. Suitable pharmaceutically acceptable carriers and agents are described in detail in Remington's Pharmaceutical Sciences (19th ed., 1995).

A suitable dosage of the pharmaceutical composition of the present invention may variously prescribed depending on such factors as formulation method, mode of administration, patient's age, body weight, sex, severity of disease, diet, frequency of administration, route of administration, excretion rate, and response sensitivity. On the other hand, the dosage of the pharmaceutical composition of the present invention is preferably 0.0001 to 100 mg/kg (body weight) per day.

The pharmaceutical composition of the present invention may be administered orally or parenterally. In the case of parenteral administration, the composition may be administered by topical application to the skin, intravenous injection, subcutaneous injection, intramuscular injection, intraperitoneal injection, transdermal administration, or the like. The concentration of the effective ingredient contained in the composition of the present invention may be determined in consideration of the purpose of treatment, the condition of patient, the required period of time, and the like, and is not limited to a particular range of concentration.

The pharmaceutical composition of the present invention may be formulated into a unit dosage form or a multidose container using the pharmaceutically acceptable carriers and/or excipients according to the methods easily conducted by those skilled in the art to which the present invention pertains. In this case, the formulation may be in the form of a solution in an oily or aqueous medium, suspension or an emulsion, or in the form of an extract, powders, granules, a tablet or a capsule, and may additionally contain a dispersing or stabilizing agent.

As used herein, the term "treating" or "treatment" refers to reversing, alleviating, inhibiting the progress of, or preventing the disorder or disease to which such term applies, or one or more symptoms of such disorder or disease. The treatment or therapy of a degenerative brain disease in a mammal may include one or more of the following:

(1) inhibiting the growth of a degenerative brain disease, that is, blocking its development,
(2) preventing the spread of a degenerative brain disease,
(3) relieving symptoms of a degenerative brain disease.

The degenerative brain disease according to the present invention may be, but not limited thereto, Alzheimer's disease, Parkinson's disease, Huntington's disease, Lou Gehrig's disease, Niemann-Pick disease, or stroke.

In addition, PAK4 or CRTC1 contained in the pharmaceutical composition of the present invention may be contained in the form of a vector containing a polynucleotide encoding each of the PAK4 protein or the CRTC1 protein.

The vector that may be used in the present invention means, but not limited thereto, a plasmid, a phage, a cosmid, a viral vector or other vehicles known in the art. Also, in the present invention, the polynucleotide encoding PAK4 or CRTC1 may be isolated from its natural environment, or produced synthetically or modified. The base sequence encoding the PAK4 or CRTC1 protein may be modified by substitution, deletion or insertion of one or more nucleic acid bases, and the expressed protein with such modification should not contain any significant change in its biological functionality. Such modification includes modification to a xenogenic homologous gene.

The expression vector according to the present invention may be introduced into cells using methods known in the art. For example, although not limited thereto, transient transfection, microinjection, transduction, cell fusion, calcium phosphate precipitation, liposome-mediated transfection, DEAE dextran-mediated transfection, polybrene-mediated transfection, electroporation, gene gun, and other known methods for introducing nucleic acids into cells may be used to introduce the expression vector into cells (Wu et al., J. Bio. Chem., 267: 963-967, 1992; Wu and Wu, J. Bio. Chem., 263: 14621-14624, 1988).

The present invention provides a diagnostic kit for a degenerative brain disease including an agent for detecting CRTC1 ((cyclic adenosine 3',5'-monophosphate response element-binding protein) regulated transcription coactivator 1).

The agent is capable of detecting the expression or activity of CRTC1, and may be a compound, peptide, probe or antibody, specific for CRTC1.

The detection of expression of CRTC1 may be detecting the mRNA level of CRTC1 gene or its protein level, and a printer or probe specific for the gene may be used therefor. The primer or probe specific for the CRTC1 gene may be a primer or probe capable of specifically amplifying the entire region or a specific region of the CRTC1 gene, and the primer or probe may be designed through methods known in the art.

As used herein, the term "primer" refers to a single-stranded oligonucleotide which is capable of acting as an initiation point of template-directed DNA synthesis when placed under suitable conditions (i.e., four different nucleoside triphosphates and a polymerization reaction enzyme) in a suitable buffer and at a suitable temperature. The suitable length of a primer may vary depending on various factors, such as temperature and application of primer. In addition, the sequence of a primer is not required to have a perfectly complementary sequence to the partial sequence of a template. It is enough for the primer to have a sufficient complementarity to the extent that the primer is capable of hybridizing with the template to exert its intrinsic action. Thus, the primer in the present invention is not required to have a perfectly complementary sequence to a nucleotide sequence of a template gene. It is enough for the primer to have a sufficient complementarity to the extent that the primer is capable of hybridizing with the sequence of the template gene to exert its action. Further, the primer according to the present invention may be preferably used for gene amplification reaction.

As used herein, the term "probe" refers to a natural or modified monomer, or a linear oligomer having linkages, including a deoxyribonucleotide and a ribonucleotide and capable of specifically hybridizing with a target nucleotide sequence, wherein it occur naturally or is produced synthetically. The probe according to the present invention may be a single chain, preferably an oligodeoxyribonucleotide. The probe of the present invention may include a natural dNMP (that is, dAMP, dGMP, dCMP, and dTMP), and a nucleotide analogue or derivative. Also, the probe of the present invention may include a ribonucleotide. For example, the probe of the present invention may include a backbone-modified nucleotide, such as peptide nucleic acid (PNA) (M. Egholm et al., Nature, 365:566-568(1993), phosphorothioate DNA, phosphorodithioate DNA, phosphoramidate DNA, amide-linked DNA, MMI-linked DNA, 2'-O-methyl RNA, alpha-DNA and methylphosphonate DNA, a sugar-modified nucleotide, such as 2'-O-methyl RNA, 2'-fluoro RNA, 2'-amino RNA, 2'-O-alkyl DNA, 2'-O-allyl DNA, 2'-O-alkynyl DNA, hexose DNA, pyranosyl RNA and anhydrohexitol DNA, and a nucleotide having a base modification, such as C-5 substituted pyrimidine (the substituent includes fluoro-, bromo-, chloro-, iodo-, methyl-, ethyl-, vinyl-, formyl-, ethenyl-, propynyl-, alkynyl-, thiazolyl-, imidazolyl-, and pyridyl-), 7-deazapurine having a C-7 substituent (the substituent includes fluoro-, bromo-, chloro-, iodo-, methyl-, ethyl-, vinyl-, formyl-, alkynyl-, alkenyl-, thiazolyl-, imidazolyl-, and pyridyl-), inosine, and diaminopurine.

In addition, in the present invention, the substance capable of measuring the level of the protein may include an antibody such as a polyclonal antibody, a monoclonal antibody, and a recombinant antibody, capable of specifically binding to the protein expressed from the CRTC1 gene of the present invention.

The "antibody" may be prepared using techniques known to those skilled in the art. When it comes to preparation of the antibody, in the case of a polyclonal antibody, for example, it may be produced by any methods well known in the art, in which an antigen of the protein is injected into an animal, and then blood is collected from the animal to obtain serum containing the antibody. The polyclonal antibody may be prepared from any animal species host such as goats, rabbits, sheep, monkeys, horses, pigs, cattle, dogs, etc. In the case of a monoclonal antibody, it may be prepared using the hybridoma method (Kohler et al., European Journal of Immunology, 6, 511-519, 1976) well known in the art or may be prepared using the phage antibody library technique (Clackson et; al, Nature, 352, 624-628, 1991, Marks et al, J. Mol Biol., 222: 58, 1-597, 1991). In addition, the antibody according to the present invention may include a functional fragment of an antibody molecule, as well as a complete form having two full-length light chains and two full-length heavy chains. The functional fragment of antibody molecule means a fragment retaining at least an antigen-binding function and includes Fab, F(ab'), F(ab')2, Fv, and the like.

It is preferable to use an antibody capable of detecting phosphorylation of the serine 215 residue in CRTC1.

In the present invention, peptide agents capable of detecting the expression or activity of CRTC1 may be obtained by a conventional method known in the art, for example, a phage display method (Smith G P, "Filamentous fusion phage: novel expression vectors that display cloned antigens on the virion surface". Science 228 (4705):13151317(1985); Smith G P, Petrenko V A, "Phage display". Chem. Rev. 97 (2): 391410 (1997)).

Further, if the kit of the present invention is applied to a PCR amplification process, it may optionally include reagents required for PCR amplification, for example, buffer, DNA polymerase (e.g., heat-stable DNA polymerase obtained from *Thermus aquaticus* (Taq), *Thermus thermophilus* (Tth), *Thermus filiformis*, *Thermis flavus*, *Thermococcus literalis* or *Pyrococcus furiosus* (Pfu)), DNA polymerase cofactor and dNTPs. If the kit of the present invention is applied to an immunoassay, it may optionally include a secondary antibody and a labeling substrate. Furthermore, the kit according to the present invention may be produced with a number of separate packaging or compartments containing the reagent components described above. The kit of the present invention may be a diagnostic kit containing essential elements required for performing a DNA chip. The DNA chip kit may include a substrate on which a cDNA corresponding to a gene or a fragment thereof is attached as a probe, and reagents, agents, enzymes, and the like for producing a fluorescent labeled probe. In addition, the substrate may contain a cDNA corresponding to a quantitative control gene or a fragment thereof.

Furthermore, the present invention provides a method for screening a substance for the prevention or treatment of a degenerative brain disease, comprising (a) applying a candidate drug to brain tissue or brain cells containing CRTC1 gene or CRTC1 protein; (b) measuring the degree of phosphorylation of CRTC1; and (c) determining the candidate drug as a substance for the prevention or treatment of a degenerative brain disease when the measurement in step (b) indicates that the phosphorylation in CRTC1 is increased.

The CRTC1 phosphorylation in step (b) may be obtained by measuring phosphorylation on the serine 215 residue in the CRTC1 amino acid sequence of SEQ ID NO: 3. The measurement in step (c) may be performed using one selected from the group consisting of Western blot, immunoprecipitation assay, enzyme linked immunosorbent assay (ELISA), radioimmunoassay (RIA), and immunohistochemical analysis.

Hereinafter, the present invention will be described in more detail by way of examples. These examples are given to more specifically describe the invention and are not intended to limit the scope of the invention thereto.

PREPARATION EXAMPLES

Materials and Experimental Methods

The commercial sources of the materials used in the following experiments and the experimental methods are as described below. In addition, the samples from patients with Parkinson's disease used in the experiments were obtained from Victoria Brain Bank Network (VBBN), and the experimental methods were conducted under the conditions approved by the Ethics Review Committee of the Institutional Review Board of Chungbuk National University (approval number: CBNU-IRB-2011-T01).

Also, the rats used in the experiments were 260 to 280 g of Female Sprague-Dawley rats obtained from Taconi, and kept under 12-hour light/dark cycles while being fed a normal diet. Animal experiments were also conducted under the conditions approved by the Ethics Review Committee of Chungbuk National University for Animal Experiments (approval number: CBNUA-400-12-02).

In addition, human tissues used in the experiments were obtained from VBBN, and all experiments were conducted under the conditions approved by the Ethics Review Committee of the Institutional Review Board of Chungbuk National University (approval number: CBNU-IRB-2011-T01). Immunohistochemical analysis were performed using 7 cases of patients with Parkinson's disease, 6 cases of age-matched control, and 4 cases of young control. 7 patient samples and 7 control samples were as described in Table 1 below.

TABLE 1

Sample groups used in the experiments

| Group | Gender | Age, years (range) | PMI, hours (range) |
|---|---|---|---|
| YC | 4M | 41.9 (39-43) | 39.1 (31-51) |
| AC | 4M/3F | 72.2 (63-79) | 28.7 (19-54) |
| PD | 5M/2F | 71.9 (63-80) | 39.2 (20-65) |

PMI, post-mortem interval;
YC, young control;
AC, age-matched control;
PD, Parkinson's disease;
M, male;
F, female.

(1) Antibodies and Inhibitor Reagents

As for the primary antibodies used in the experiments of the present invention, the following antibodies were used: rabbit anti-tyrosine hydroxylase (TH) (Pel-Freez, Brown Deer), mouse anti-TH (MAB5280, Millipore), rabbit anti-phospho-PAK4 (Ser474) (#3241, Cell Signaling), rabbit anti-PAK4 (ab19007, Abcam), rabbit anti-PAK5 (Abcam, ab11069), rabbit anti-PAK6 (Boster Biological Technology, PA1729), mouse anti-α-synsynsyn. (SNCA) (MAB5383, Abnova), rabbit anti-GAPDH (sc25778, Santa Cruz Biotechnology), mouse anti-Bcl-2 (sc7382, Santa Cruz Biotechnology), goat anti-allograft inflammatory factor 1 (Iba-1) (ab5076, Abcam), mouse anti-CD11b (MCA275C, Serotec, Oxford, UK), mouse anti-GFAP (Millipore), rabbit anti-GFP (sc8334, Santa Cruz Biotechnology), rabbit anti-Myc (sc789, Santa Cruz Biotechnology), rabbit anti-BDNF (ERP1292, Novus Biologicals), rabbit anti-PGC-1α (NBP1-04676, Novus Biologicals), mouse anti-CRTC1 (ab176472, Abcam), rabbit anti-His (#2366S, Cell Signaling), GST-conjugated horseradish peroxidase (HRP) (ab3416, Abcam). The polyclonal antibody Phospho-CRTC1S215 was primarily purified from rabbits immunized with the phosphopeptide RPKpSERCEVPGINIFPC by Gen Script (Piscataway, NJ, USA). The phospho-CRTC1 antibody pS215 was isolated from sera obtained by using a phosphorylated peptide, and PF-3758309 was purchased from Pfizer (San Diego, Calif 92121, USA).

(2) Preparation of Animal Model of Parkinson's Disease (6-OHDA Lesions)

Mice were anesthetized with chloral hydrate (360 mg/kg, intraperitoneal [i.p.] injection) and then placed in a stereotaxic instrument (Kopf Instruments, Tujunga, CA, USA). The injection site coordinates in the right MFB were 4.3 mm anterior-posterior (AP), 2.0 mm medial-lateral (ML) and 8.0 mm dorsal-ventral (DV), from the bregma. Then, 6-OHDA was injected using a Hamilton syringe needle (33-gauge needle). The 6-OHDA solution (4 ul) was injected at a flow rate of 0.25 ul/min. After the injection, the syringe needle maintained as it is for 5 more minutes to suppress the reflux of the solution.

(3) Delivery of PF-3758309 by Stereotaxic Injection

Mice were anesthetized with chloral hydrate (360 mg/kg, intraperitoneal [i.p.] injection) and then placed in a stereotaxic instrument (Kopf Instruments, Tujunga, CA, USA). The injection site coordinates in the right SN were 5.3 mm AP, 2.0 mm ML and 7.6 mm DV, from the bregma. Then, PF-3758309 (0.5 μg) was injected using a Hamilton syringe needle (33-gauge needle). In this case, the flow rate of the injection solution (2 ul) was allowed to be at 0.25 ul/min. After the injection, the syringe needle was maintained as it is for 5 more minutes to suppress the reflux of the solution.

4) Structure of Lentivirus-Plasmid and Production of Lenti-shRNA Virus

Lentiviral rat PAK4 hCMV-TurboGFP shRNAs were purchased from Dharmacon and Open Biosystems. SH-082018-01 (TTACGCAAGTCCATCTTCT) and SH-082018-02 (TGATCGAAGCCTGTGTGTA) effectively knocked down the expression of PAK4. In addition, lentiviral rat CRTC1 hCMV-TurboGFP shRNAs were purchased from Dharmacon and Open Biosystems, and SH-111776-01 (CACGATATACTCTGTCCAC) and SH-111776-02 (TCGCTAAATTTCCGCGGAT) effectively knocked down the expression of CRTC1. In this case, lentiviral shRNA control particles (#S-005000-01) were used as a control.

(5) Structure of Lentivirus-Plasmid and Production of Lenti-Active PAK4S445N/S474E A cDNA of active PAK4 (S445N/S474E) was subcloned into the lenti-EF1-α-WPRE-SV-40 Poly-A (lenti expression vector). HEK293T cells were cultured in DMEM medium containing 10% fetal bovine serum and 1% penicillin/strepotomycin under the conditions of 37° C. and 5% $CO_2$. 24 hours prior to transformation, $4 \times 10^6$ HEK293T cell line was seeded on 100 mm dishes, and, after one day, cells were transfected by treating cells with 20 μl of a lentiviral packaging mix (Systembio) encoding the viral proteins of Gag-Pol, Rev and VSV-G, and 2 ug of a lentiviral transgene plasmid. Lentiviral products were induced using Turbofect (Thermo Fisher Scientific). After 14 hours, the DNA-reagent mixture was removed and replaced with DMEM medium containing 5% FBS. 48 hours after transfection, the supernatant containing lentivirus was collected and then filtered using a 0.45 um filter. Then, cold PEG-it virus precipitation solution (System Biosciences), which corresponds to 4-fold volume of the filtrate, was added. The supernatant/PEG-it mixture was centrifuged at 1,500×g for 30 minutes at 4° C., and the virus pellet was suspended in 10 ul of cold DMEM medium. To check the transfection rate, HEK293T cells ($3 \times 10^3$, in a 96-well plate) were infected with lentivirus collected from transfected HEK293T cells. After 72 hours, GFP-positive cells were identified by fluorescence microscopy (Nikon).

(6) Preparation of Tissues for Immunohistochemistry and Nissl-Staining

Mice were anesthetized with chloral hydrate (360 mg/kg, intraperitoneal [i.p.] injection) over time and then perfused transcardially with 0.9% saline solution containing 0.5% nitrate and heparin (10 U/ml). The tissue was then fixed with cold 4% paraformaldehyde (PFA) at pH 7.4. Brains were removed from the skulls and subsequently fixed with 4% PFA at 4° C. for 24 hours, then placed in a 30% sucrose solution and allowed to stand until precipitation. Brains were cut into 35 μm coronal sections using a sliding microtome, frozen, and then prepared as six separate sets by imbedding with the optimal cutting temperature (O.C.T) compound (Surgipath). Each section was stored at a temperature condition of 20° C. in a cryopreservative medium.

(7) Preparation of Tissues for Immunoblotting Analysis

After anesthetizing the mice, the brains were removed and the SNs were segmented using a dissecting microscope. The segmented tissues were frozen on dry ice and then stored at 80° C. The stored tissues were then used for immunoblotting.

(8) Immunohistochemistry

Human brain tissue slices embedded with paraffin were deparaffinized with xylene. Tissue sections were washed with cold PBS for 15 min and reacted at room temperature for 1 hour using the blocking solution PBS (0.3% Triton X-100, 1% bovine serum albumin [BSA], 0.05% Tween 20, 0.1% cold fish gelatin, and 0.05% sodium azide). The primary antibody was diluted with antibody Diluent (Dako S3022). Samples were reacted with Alexa 488- or Alexa 594-conjugated secondary antibodies for fluorescence microscopic analysis. The nuclei were stained with 4',6-diamidino-2-phenylindole (DAPI) (Thermo Fisher Scientific). For light microscopic analysis, brain tissues were reacted with biotin conjugated secondary antibodies and streptavidin-conjugated HRP (Vectastain ABC kit, Vector Laboratories). Immunostaining was visualized by reacting with samples in a 0.1 M-PB solution containing 0.05% diaminobenzidine-HCl (DAB) and 0.003% hydrogen peroxide. Brain tissues were reacted with alkaline phosphatase-conjugated secondary antibodies (Vector Laboratories) for co-immunostaining of pPAK4 and Bcl-2 or TUNEL. Immunostaining was visualized with an Alkaline Phosphatase Substrate Kit I (Red) or an Alkaline Phosphatase Substrate Kit III (blue) (Vector Laboratories). For Nissl-staining, SN tissue was fixed on a gelatin-coated slide and dried at room temperature for 1 hour, stained with 0.5% cresyl violet, dehydrated, covered with a cuff slip and analyzed using a bright field microscopy (Nikon).

(9) TUNEL Analysis

TUNEL analysis was performed using the ApopTag Fluorescein Direct In Situ Apoptosis Detection Kit (Millipore) according to the manufacturer's suggested protocol.

(10) Immunoblotting and Quantitative Analysis

Protein extracts were obtained by conventional protein extraction methods, and immunoblots were visualized using HRP-conjugated secondary antibodies to IgG and chemiluminescent substrate (SuperSignal Ultra; Pierce). For quantitative analysis of protein levels, each band density of the immunoblots was quantitatively analyzed using the National Institutes of Health ImageJ software (National institutes of Health).

(11) Stereological Cell Counting

The unbiased stereological analysis of the total number of TH+ neurons was performed using an optical fractionator method and Stereo Investigator software (MBF Bioscience, Williston, VT). The method is an assay which is not influenced by reference volume (SNpc) or size of counted elements (neurons). The total number of neurons was calculated by Optical Fractionator Equation. Analysis was performed for over 300 points to cover all sections of each specimen. All animals used in this experiment were assigned code numbers, and blind analysis was performed for quantitative comparative analysis. Nissl-staining was also analyzed by evaluating the number of neurons in the SN.

(12) Quantitative Analysis of Striatal Fiber Density

The optical density of striatal TH+ fibers was analyzed using ImageJ software. The whole area of the striatum was also analyzed, and the analytical value was expressed as a percentage value relative to 100% lateral value in an original state.

(13) Measurement of Levels of Dopamine and Metabolites

Mouse striatal samples were prepared 4 weeks after 6-OHDA injection. The sectioned samples were immediately frozen on dry ice and stored at −80° C. The samples were then sent to Korea Advanced Institute of Science and Technology so that HPLC analysis is performed therefor.

(14) Behavior Analysis

Amphetamine-induced rotational behavior was allowed to be automatically analyzed by using TSE Video Mot2system (Germany) for 120 min after I.P. injection of 2.5 mg/kg D-amphetamine sulfate (Lipomed). The cylinder test was performed by placing each experimental animal in a cylinder (20 cm diameter, 30 cm height) and letting it act for 10 minutes. Then, the number of touches by ipsilateral vs. counterlateral paw on the cylinder wall was analyzed.

(15) Cell Culture

Culture of primary mouse mesencephalic neurons was performed in the following manner. Cells were seeded on a culture plate coated with poly-D-lysine (Sigma) and laminin (Upstate Biotech, NY), and then cultured while replacing the medium with the chemically purified serum-free medium, DMEM/F12 medium (with 1% insulin-transferrin-selenium (ITS) supplement (Gibco), 100 U/ml of penicillin/streptomycin (Invitrogen) (DM)), for 2 days (DIV2), in order to suppress growth and proliferation of glial cells. At day 4 after culture, the culture was treated with 6-OHDA (30 μM) dissolved in DM without vehicle or ITS. The human neuroblastoma SH-SY5Y cells (passage<15) were cultured in MEM medium supplemented with 5 mM HEPES, 25 mM NaHCO3, 10% FBS and antibiotics, and HEK293T cells were cultured in DMEM medium supplemented with 10% fetal bovine serum (FBS) and antibiotics. All of these cells were incubated at 5% CO2 and a temperature condition of 37° C.

(16) Plasmid Construction

The wild-type PAK4 (PAK4WT), caPAK4 (PAK4S445N/S474E), PAK4S474E, and N-terminal 3x-Myc tagged types were prepared by the method disclosed in Oncogene 32, 24752482 (2013). Human CRTC1 gene (Gene Bank: BC028050) was purchased from 21C Frontier Human Gene Bank (Clone ID: hMU004596, Daejeon, Korea). A set of specific oligomers for cloning and mutagenesis were custom-synthesized by Bioneer (Daeleon, Korea). CRTC1 open reading frames were amplified by PCR using specific oligomers and introduced into pET24a (EcoRI/XhoI) or pEGFP-C2 (EcoRI/SalI) vectors to give His-tag or GFP-tag. The CRTC1-alanine (A) mutants for serine (S) 151, S215, threonine (T) 149 and T449 were subjected to a site-directed mutagenesis using a Quick Change Site-Directed Mutagenesis Kit (Stratagene, La Jolla, CA, USA).

(17) Transfection

Transfection was performed by treating cells with DNA or siRNA mixed together with Lipofectamine 2000 reagent (Invitrogen).

(18) LDH Cytotoxicity Analysis

Cytotoxicity analysis was performed using LDH cytotoxicity kit (Abcam) wherein activity of LDH was measured in damaged cells after LDH release from cytosol. SH-SY5Y cells were seeded on a 12-well tissue culture plate at 1.5×105 cells/well and cultured in MEM medium supplemented with 25 mM HEPES, 25 mM NaHCO3, 10% FBS and antibiotics. After one day, the medium was replaced with medium containing 1% FBS, and cells were treated with 6-OHDA (SH-SY5Y; 100 μM; primary mesencephalic neuronal cells, 30 μM). After 24 hours, the cytotoxicity was analyzed using an ELISA reader at the absorbance of 495 nm according to the manufacturer's protocol.

(19) CRE-Reporter Analysis

To analyze the effect of CRTC1, CRTC1 siRNAs (100 nM) were transfected into HEK293T cell line using Lipofectamine LTX reagent (invitrogen) for 48 hours. Cells transfected with siRNA were subsequently co-transfected with genes of Myc-caPAK4 (1 μg), CRE-luciferase reporter (500 ng) and Renilla luciferase (20 ng) for 24 hours. For the analysis of the effect of S215A CRTC1 mutation, HEK293T cell line was co-transfected with GFP-CRTC1-WT (100 ng or GFP-CRTC1S215A. (100 ng) plus the CRE-luciferase reporter (30 ng) and Renilla luciferase (20 ng) for 24 hours, in which case experiments were performed with Myc-caPAK4 (1 µg)-treated group and untreated group being divided. Renilla luciferase vector was used as an internal control. Reporter assay was repeated in triplicate in 24-well plates and luciferase activity was measured using Dual-Luciferase Reporter assay system (Promega, Madison, WI, USA).

(20) Preparation of His-CREB/His-CRTC1 Protein

The CREB/CRTC1 cDNA was cloned into the pET24a vector and expression was induced in *E. coli* BL21 (DE 3). A set of specific oligomers for the preparation of CREB mutants were custom-synthesized by Bioneer (Daejeon, Korea). The CREB-alanine (A) mutant for serine (S) 133 was prepared using Quick Change Site-Directed Mutagenesis Kit (Stratagene, La Jolla, CA, USA). The His-CREB/His-CRTC1 expression protein was obtained by purification through a Ni-NTA column.

(21) siRNA siRNA for human CREE (#1, 1035590 and #2, 1035585), siRNA for human CRTC1 (#1, 1036087 and #2, 1036078) and scrambled siRNA were purchased from Bioneer (Daejeon, Korea). CRTC1 siRNAs (100 nM) and CREB siRNAs (100 nM) were transfected with Lipofectamine LTX (Invitrogen) for 48 hours.

(22) In Vitro Kinase Assay

His-CREB/His-CRTC1 was cultured using phosphorylation assay buffer ((20 mM Tris-HCl, pH 8.0; 10 mM MgCl2; and 1 mM dithiothreitol) containing 100 mM ATP and 5 µCi [γ-32P]ATP (PerkinElmer, Waltham, MA, USA) at 30° C. for 30 min, respectively, in the presence and absence of PAK-C (Millipore, San Diego, CA 92121)/GST-active (Active Motif, Carlsbad, CA 92008). For analysis of PAK4 autophosphorylated from phosphorylated CRTC1, GST-PAK4 (active-PAK4) alone was reacted. Proteins were subjected to electrophoresis and the phosphorylation of the target protein was analyzed by autoradiography and immunoblotting.

(23) Immunoprecipitation

Cells were lysed with lysis buffer (50 mM HEPES, pH 7.5; 150 mM NaCl; 10% glycerol; 1% Triton X-100; 500 µM EDTA; 200 µM sodium pyruvate; and 50 mM β-glycerophosphate) supplemented with protein inhibitors to obtain a cell lysate. The cell lysate was stored at 4° C. for 1 hour and then centrifuged at 14,000 rpm for 20 minutes. Then, immunoprecipitation was performed with an anti-PAK4 antibody at 4° C. for 18 hours. Immunoprecipitates were collected by adding protein-G agarose and washed 5 times with lysis buffer. The immunoprecipitates were then immunoblotted with anti-CRTC1, anti-PAK4 or anti-CREB antibodies.

(24) In Vitro Reaction Analysis

Recombinant PST and GST-PAK4-wild type proteins were separated using glutathione HiCap Matrix and Ni-NTA agarose (Qiagen), respectively. For in vitro protein-protein interaction analysis, purified GSTS or GST-PAK4s were reacted in binding buffer using His-CRTC1-bound Ni-NTA beads at 4° C. for 2 hours. Subsequently, after washing, the remaining proteins were eluted from the beads by heating and then immunoblotted using anti-GST antibodies and anti-His antibodies.

Example 1

Analysis for Neuroprotective Activity of PAK4 in Parkinson's Disease

Expression levels of pPAK4 and PAK4 in Parkinson's disease were analyzed. As for samples for analysis, the tissue samples obtained from the subjects for experiments in Table 1 above were immunoblotted with pPAK4 and PAK4 antibodies.

As a result, as shown in FIG. 1, it has been shown that expressions of pPAK4 and PAK4 were all reduced in the samples derived from patients with Parkinson's disease compared to the control samples. In addition, it has been shown that the expression level of TH, a marker of DA neurons, was also reduced in the Parkinson's disease group compared to the control group (see FIGS. 1A and 1B). Besides, the expression levels of pPAK4 and PAK4 in living TH-positive DA neurons were analyzed. As a result, it has been shown that the expression in DA neurons of the Parkinson's disease group was reduced compared to the control groups (age-matched control, young control) (see FIGS. 1C to 1E). In addition, the ratio of pPAK4/PAK4 in DA neurons of the Parkinson's disease group was analyzed. As a result, it has been shown that the ratio of pPAK4/PAK4 in DA neurons of the Parkinson's disease group was higher than that of the control samples (see FIG. 1F).

Example 2

Analysis of Expression Levels of PAK4 and Phosphorylated-PAK4 in Animal Model of Parkinson's Disease After each brain tissue was obtained through the experimental procedure as described above in the rat animal model of Parkinson's disease induced by administration of 6-OHDA, the expression levels of PAK4 and phosphorylated-PAK4 were analyzed.

Figure 2:
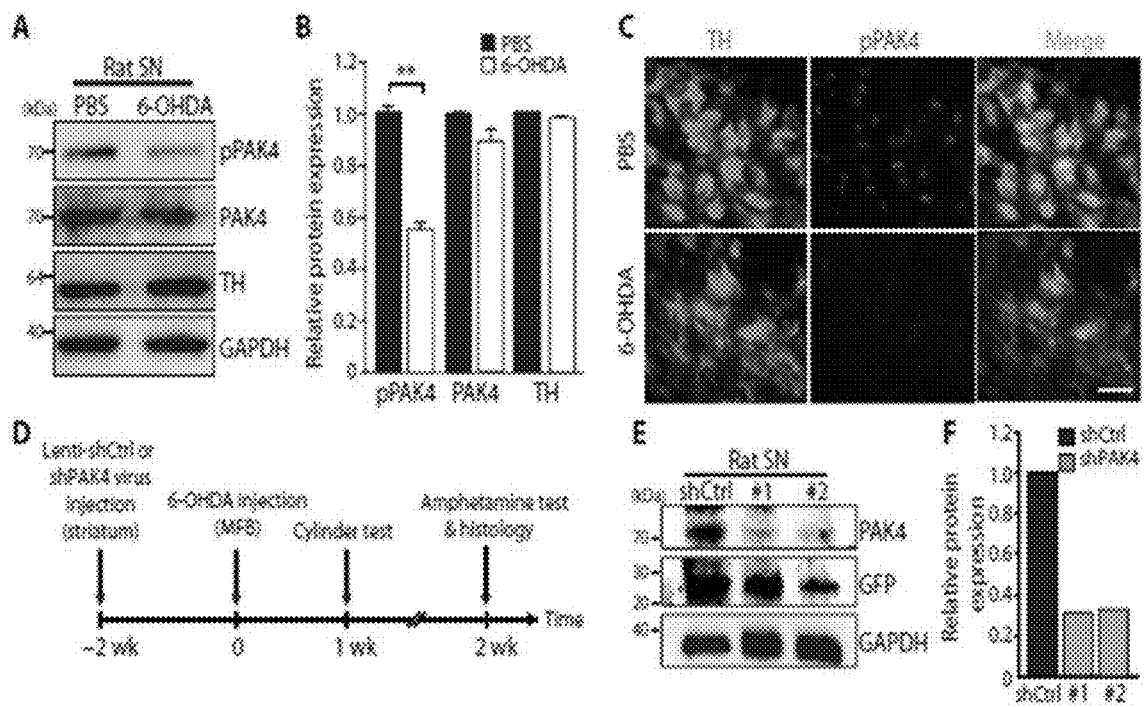
FIG. 2 shows the results of analysis for degree of brain cytotoxicity caused by 6-OHDA when PAK4 is knocked-down with shPAK4. A to C represent the expression level for pPAK4 and PAK4 in a mouse model of Parkinson's disease induced by injecting 6-OHDA by way of Western blot results (A), a graph obtained by quantifying the Western blot results (B), and the results of analysis by fluorescence microscopy (C, green-TH, red-pPAK4). D represents the experimental schedule using mice, E is the results of checking the degree of knock-down of PAK4 with shPAK4 injection, and F is a graphical representation of the results in E.

As a result, as shown in FIG. 2, it has been shown that the expression level of phosphorylated-PAK4 was significantly reduced in the samples from rats with Parkinson's disease induced by 6-OHDA, compared to the control without 6-OHDA administration (see FIGS. 2A to 2C).

Example 3

Analysis of the Action of PAK4 in Parkinson's Disease Through Loss-of-Function

As a method for checking the action of PAK4 in Parkinson's disease, the present inventors injected a lent viral green fluorescent protein (GFP) small hairpin control (shCtrl) or lentiviral-GFP-shPAK4 construct into the right striatum of the rat brain to analyze the role of PAK4 in Parkinson's disease. In this case, the experimental schedule for the loss-of-function experiment is shown in FIG. 2D.

Figure 3:
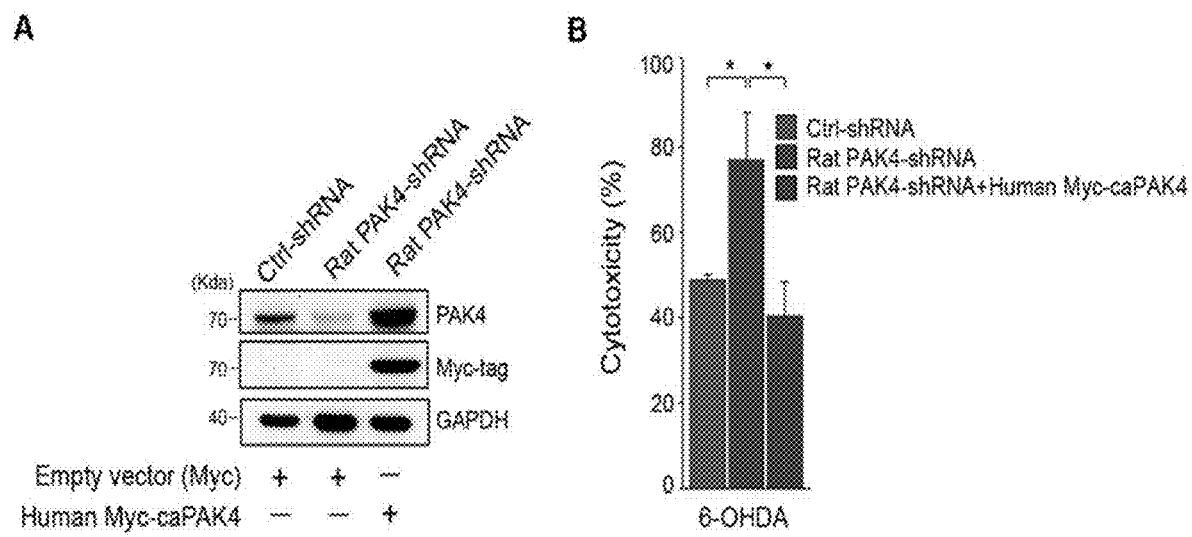
FIG. 3 shows the results of analysis for changes in cytotoxicity caused by introduction of caPAK4 after treatment with shPAK4 in a rat animal model. A represents the results where the expression of PAK4 was checked by Western blot after treating primary mouse mesencephalic neuronal cells with lentivirus-shRNA, an empty vector, and human Myc-caPAK4, respectively. B represents the results of measuring the activity of LDH for these three groups.

As a result of the analysis, it has been shown that the expression of PAK4 in the SN was significantly suppressed by the injection of PAK4 shRNA (see FIGS. 2E and 2F). Also, lentivirus expressing human caPAK4 (constitutively activated PAK4) was injected into the rat mesencephalic neurons, and then the expression level of PAK4 and the degree of brain cytotoxicity induced with 6-OHDA were analyzed. As a result, as shown in FIG. 3, it has been shown that the shPAK4-reduced expression of PAK4 was increased again, and the brain cytotoxicity was also decreased again (see FIGS. 3A and 3B).

Therefore, from these results, the present inventors have found that PAK4 acts to protect brain cells in brain cells/tissues.

Figure 4:
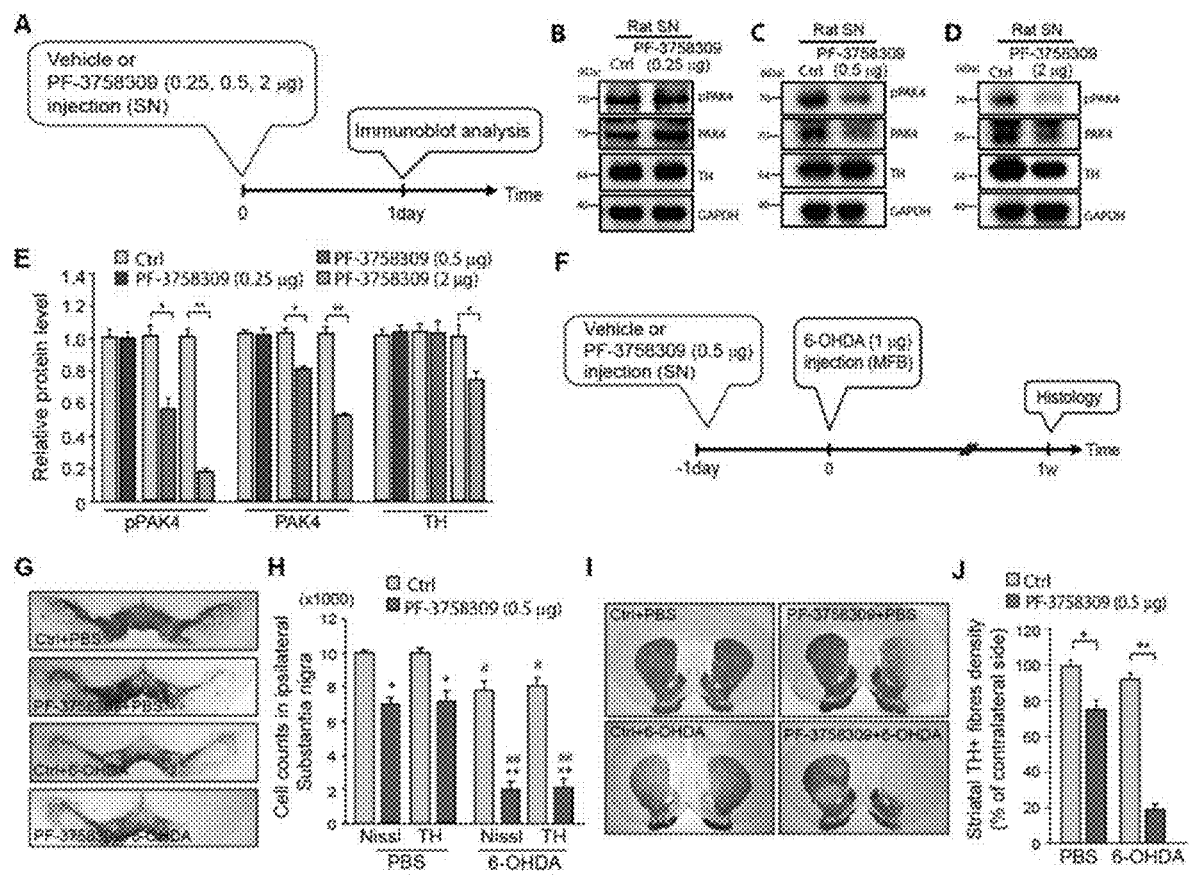
FIG. 4 shows the results of analysis for degree of changes in cytotoxicity caused by 6-OHDA following treatment with PF-3758309, which is a PAK inhibitor. A represents the experimental schedule. B to D represent the results obtained by immunoblotting the expression levels of pPAK4 and PAK4 after treatment with PF-3758309 at each concentration thereof. E represents is a graph obtained by quantifying the results in B to D, and F represents the experimental schedule. G is the results of checking the expression level of TH in each experimental group. H is a graph obtained by quantifying the number of TH-positive neurons and Nissl-stained DA neurons. I is a photographical representation of the immunostaining results of TH in the striatum. J is the quantification of the density of TH positive striatal fibers.

Further, after injecting PF-3758309, an inhibitor of PAK4, the present inventors analyzed TH-positive fibers in the SN (substantia nigra). As a result, as shown in FIG. 4, it has been shown that inhibition of PAK4 decreased TH-positive DA neurons, and ultimately, caused damages to brain cells.

Example 4

Analysis of the Action of PAK4 in Parkinson's Disease Through Gain-of-Function

Following the analysis of the action of PAK4 by knock-down of PAK4 in Example 3, the present inventors analyzed the action of PAK4 through gain-of-function by introducing a gene containing PAK4.

For this purpose, nocturnal PAK4 (PAK4$^{WT}$), activity-maintained PAK4 (caPAK4) and PAK4$^{S474E}$, which were prepared in the above Experimental methods, were injected into rats, respectively, and treated with 6-OHDA to induce brain cytotoxicity, and then the changes in activity due to the introduction of PAK4 were analyzed.

Figure 5:
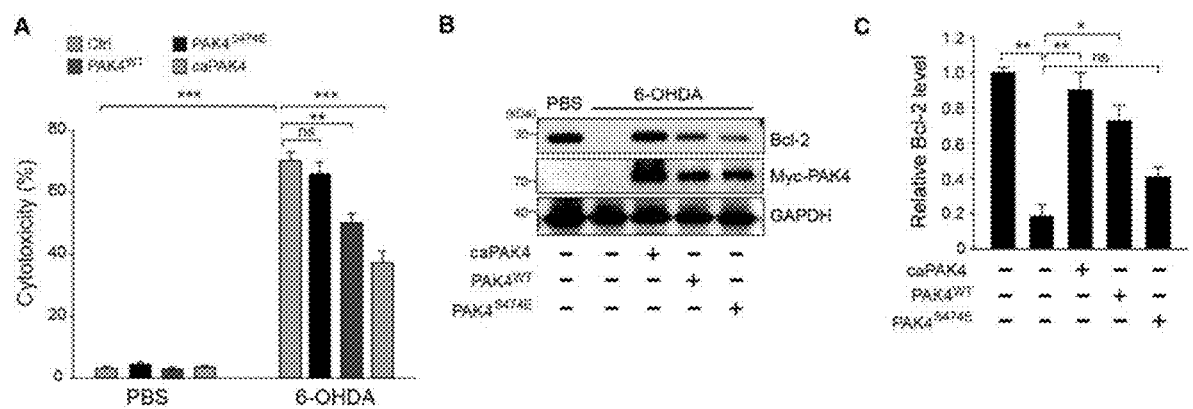
FIG. 5 shows the results of analysis for cytoprotective activity by introduction of caPAK4 and WT PAK4 in SH-SY5Y cell line in which cytotoxicity had been induced with 6-OHDA. A represents the measurement results for the activity of LDH in each experimental group. B represents the level of Bcl-2 checked by immunoblotting 24 hours after treatment with 6-OHDA. C is a graph obtained by quantifying the results in B.

As a result, it has been shown that in the SH-SY5Y cell line expressing PAK4 (PAK4$^{WT}$) or activity-maintained PAK4 (caPAK4), even though it was treated with 6-OHDA, the decrease in expression of Bcl-2, which suppresses apoptosis, was suppressed and cytotoxicity was also decreased. On the other hand, it has been shown that in the group to which PAK4$^{S474E}$ (non-phosphorylated mutant) was introduced, Bcl-2 was significantly decreased and cytotoxicity was also significantly higher than that in PAK4 (caPAK4)- and PAK4$^{S474E}$-injected groups (see FIG. 5).

Furthermore, the present inventors injected caPAK4 into the striatum of experimental rats using lentivirus, then treated them with 6-OHDA to induce cytotoxicity in the brain, and then analyzed the brain cell protective activity due to PAK4 activity.

Figure 6:
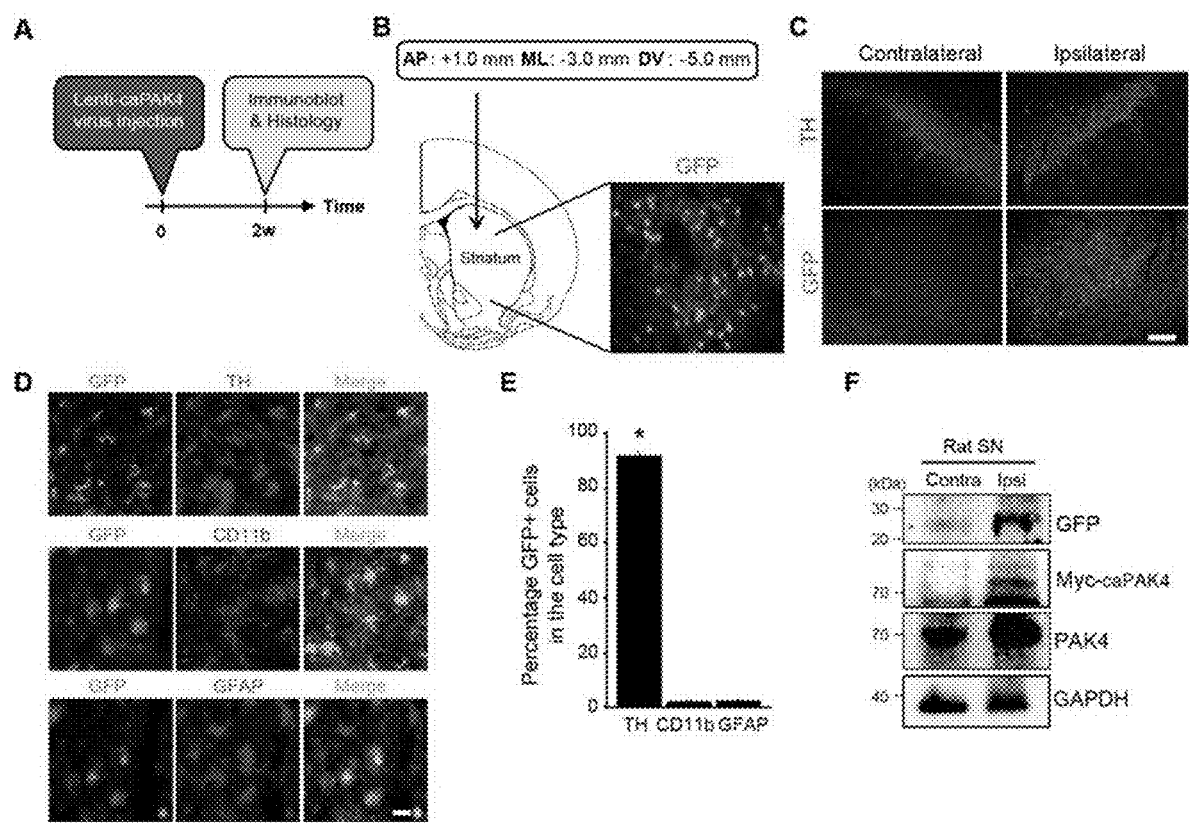
FIG. 6 shows the results of monitoring the intracellular location of caPAK4, which had been introduced using lentivirus, in the rat SN. A represents the experimental schedule. B represents the site at which lentivirus had been injected into the striatum. C represents the locations of TH (red) and caPAK4 (green) shown by a fluorescence microscope. D is the results where the presence of caPAK4 (GFP: green), not CD11b positive (red) glial cells or GFAP-positive (red) astrocytes in TH positive (red) DA neurons, was checked by double staining. E is the quantification of GFP positive cells for each type. F represents caPAK4 immunoblotted with GFP in SN lysates 2 weeks after lentiviral introduction.
Figure 7:
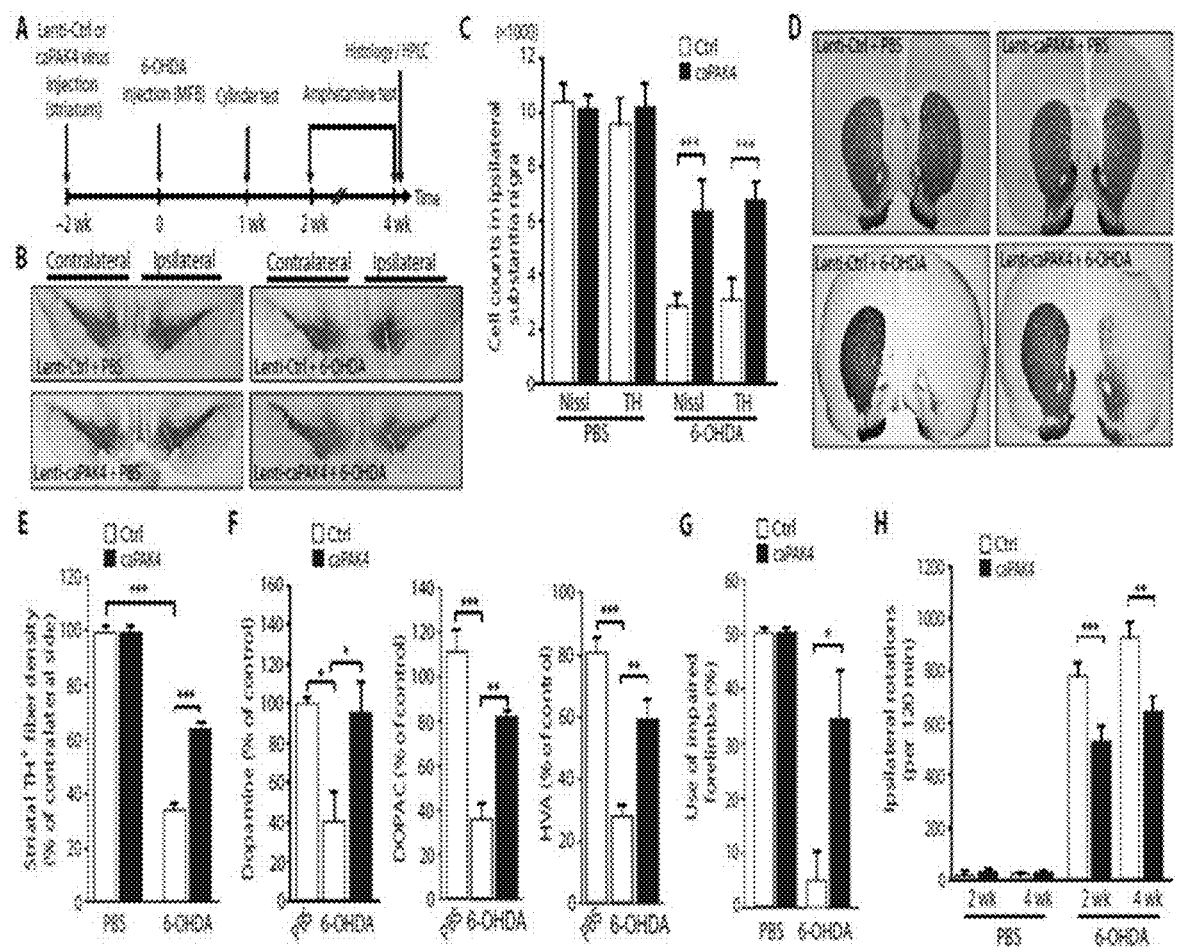
FIG. 7 shows the results of analysis for cytoprotective activity of caPAK4 against 6-OHDA-induced brain cytotoxicity. A represents the experimental schedule. B represents the results of immunostaining for TH in the SN, after treatment with PBS or 6-OHDA followed by introduction of lenti-control and lenti-caPAK4. C represents the measurement results for TH-positive cells and Nissl-stained DA neurons. D represents the results of immunostaining for TH in the striatum. E to H represent the density of TH positive striatal fibers (E), the results obtained by quantifying dopamine and its metabolites (F), the results obtained by quantifying the cylinder test (G), and the results of analysis for amphetamine-induced ipsilateral rotation (H), respectively.

As a result, as shown in FIG. 6, it has been shown that caPAK4 delivered by lentivirus was shifted from the SN to TH-positive DA neurons, and the production of the brain cell protective factors, DOPAC and HVA (homovanillic acid) was increased (see FIG. 7).

Therefore, from these results, the present inventors have found that the activity of PAK4, that the phosphorylated active form, is capable of ameliorating and treating the neurodegenerative phenomenon in the substantia nigra striatum DA due to brain damages caused by 6-OHDC, and ultimately, capable of preventing or treating Parkinson's disease through brain cell protection.

In addition, the present inventors have conducted experiments to check if PAK4 of the present invention has a brain cell protective activity against α-synuclein which is a causative agent of Parkinson's disease. For this purpose, caPAK4 virus was injected into a rat animal model, and 2 weeks later, AAV2 (Recombinant adeno-associated virus type 2) was used to inject human. WT α-synuclein gene (AAV2-α-syn) and enhanced GFP gene (AAV2-eGFP), respectively, into the rat SN. After 5 weeks, brain cells were analyzed.

Figure 8:
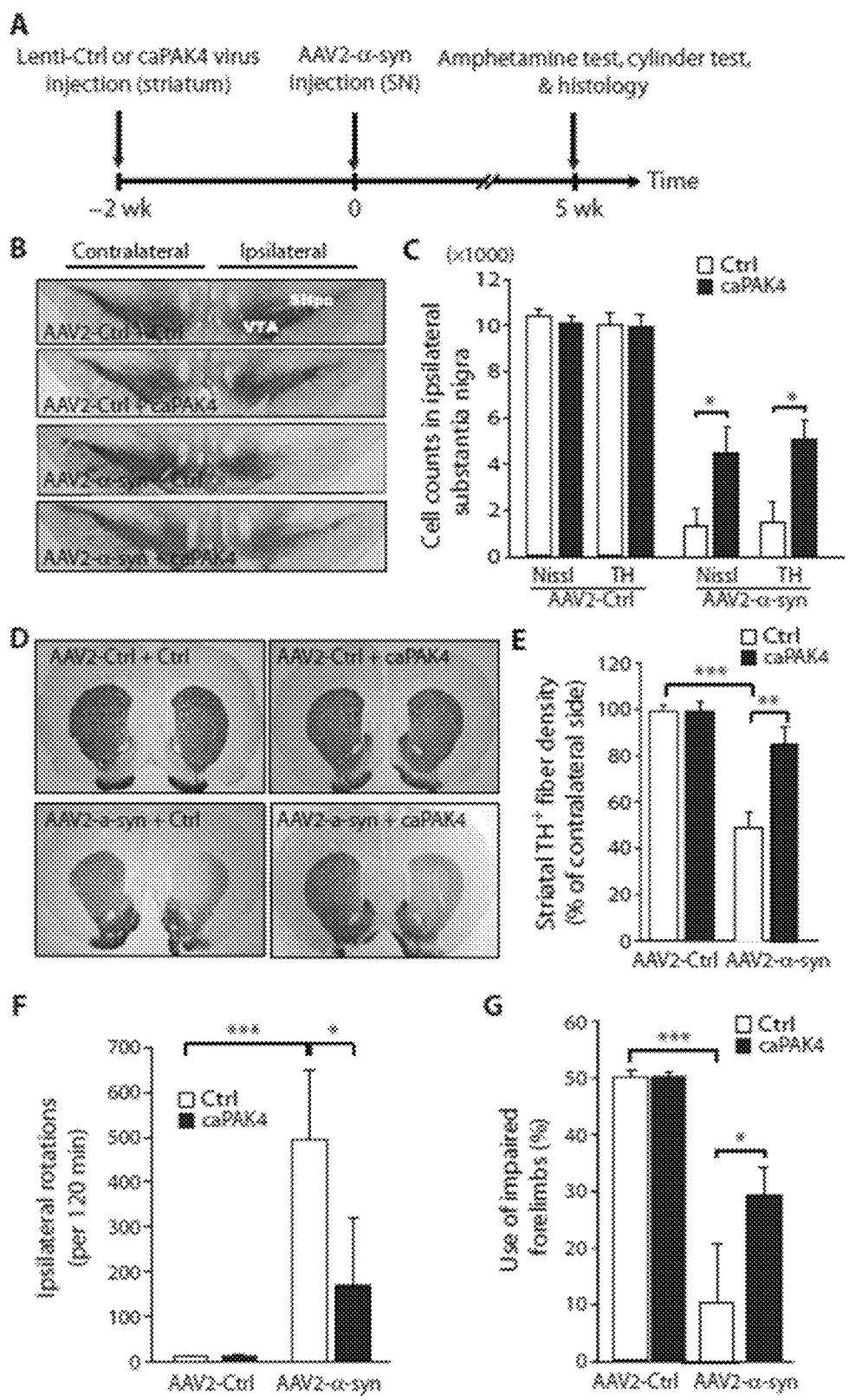

As a result, it has been shown that PAK4-injected rats had more TH-positive and Nissl-stained DA neurons, higher TH-positive fiber density, and reduced abnormal behavioral symptoms caused by brain damages (see FIG. 8).

Example 5

Influence of CRTC-CREB Signaling on Brain-Protective Effects by PAK4 Activity

Through the above experiments, the present inventors have found that PAK4 is capable of preventing and treating Parkinson's disease due to its effective brain-protective activity against brain damages causing Parkinson's disease.

Thus, during our studies for identifying the intracellular major mechanisms involved in the brain-protective activity PAK4, analysis was performed to check whether CRTC1 and CREB is involved in the brain-protective activity of PAK4.

Figure 9:
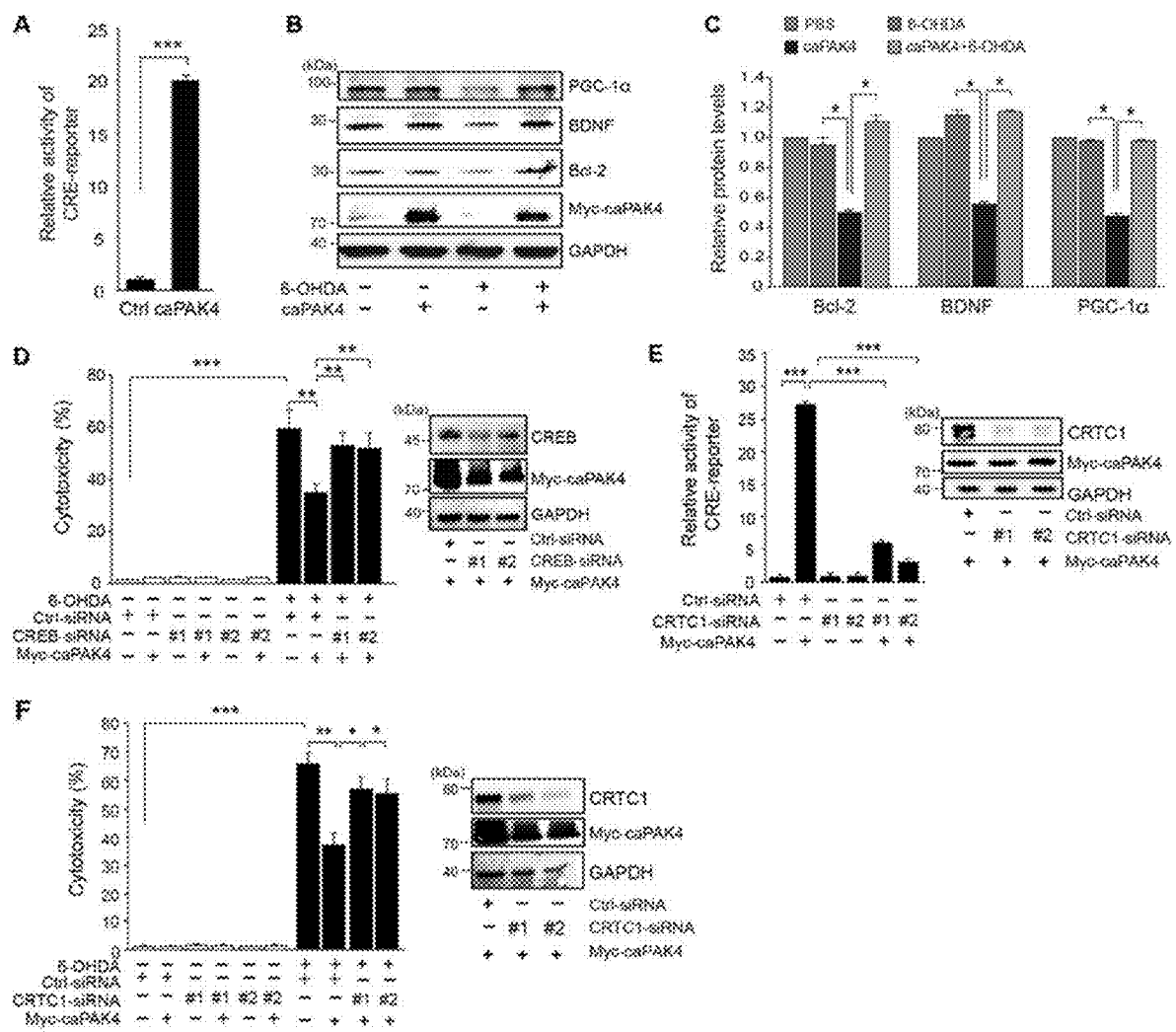
FIG. 9 shows the results of analysis for actions of CREB and CRTC1 in the brain cell protective activity of caPAK4. A represents the results of CRE reporter assay in SH-SY5Y cell line. B represents the results of immunoblotting for the CREB target proteins, Bcl-2, BNDF and PGC-1 alpha, 24 hours after treatment with 6-OHDA. C is the quantification of the results in B. D is the activity of LDH in SH-SY5Y cell line, analyzed 24 hours after treatment with 6-OHDA. E is the results of CRE reporter assay in 293T cells. F represents the results of analysis for the activity of LDH in SH-SY5Y cell line, 24 hours after treatment with 6-OHDA.

In this connection, it has been shown that expression of caPAK4 was significantly increased through CRE reporter activity in SH-SY5Y neuronal cell line, and the expression levels of the CREB target proteins, PGC-1a, BDNF and Bcl-2, whose expressions had been reduced by 6-OHDA, were restored again (see FIGS. 9A to 9C).

In addition, in order to check whether the brain protective activity of caPAK4 is CREB-dependent, CREB was knocked down using siRNA and then the brain protective activity of caPAK4 was analyzed. As a result, as shown in FIG. 9D, it has been shown that in the case of the group where CREB was knocked down with siRNA treatment, cytotoxicity was still induced in brain cells in spite of injection of caPAK4, whereas in the case of the group where caPAK4 was injected under a CREB-expressed state, 6-OHDA-induced cytotoxicity was significantly reduced.

This means that CREB mediates the brain cell protective activity of PAK4. On the other hand, since no findings had been studied and uncovered yet for the CREB-dependent transcriptional regulatory process PAK4, the present inventors have analyzed the involvement of more specific downstream transcriptional regulatory factors.

First, for this purpose, we checked whether PAK4 induces phosphorylation of CREB. As a result, it has been shown that PAK4 does not induce phosphorylation of CREB. Thus, we analyzed the effect of PAK4 on CRTC1, a coactivator of CREB.

It has been found that CRTC1 is expressed in DA neurons derived from human postmortem brain tissues and rat brain tissues. Peculiarly, it has been shown that when the expression of CRTC1 was suppressed by siRNA, CRE reporter activity caused by caPAK4 was suppressed (see FIG. 9E).

In addition, an analysis of the effect of CRTC1 on the brain-protective activity of caPAK4 was performed. As a result, it has been shown that when CRTC1 was knocked down, the cytoprotective activity of caPAK4 on cytotoxicity increased with 6-OHDA in SH-SY5Y cell line was decreased. That is, these results indicate that CRTC1-CREB signaling is involved in inhibitory activity of caPAK4 on brain cell damages induced by 6-OHDA and brain cell protective activity of caPAK4, which has been identified for the first time in the present invention. These results were also confirmed in animal models. An analysis of the effect of CRTC1 knock-down on cytotoxicity caused by 6-OHDA in a rat model of Parkinson's disease was performed. As a result, it has been found that CRTC1 expression was decreased by the injection of lenti-shCRTC1, and it has been shown that the protective activity of caPAK4 on TH-positive neurons and Nissl-stained DA neurons was reduced (see FIG. 9E).

Therefore, from these results, it has been found that CRTC1 plays a very important role in brain protective activity of caPAK4.

Example 6

Analysis of the Effect of Phosphorylation at S215 in CRTC1 on the Brain-Protective Activity of caPAK4

The present inventors have found that CRTC1 is located in the nucleus in DA neurons and that phosphorylated PAK4 is also located in the nucleus. Thus, the present inventors performed immunoprecipitation analysis to check whether or not PAK4 interacts with CRTC1 and CREB.

Figure 10:
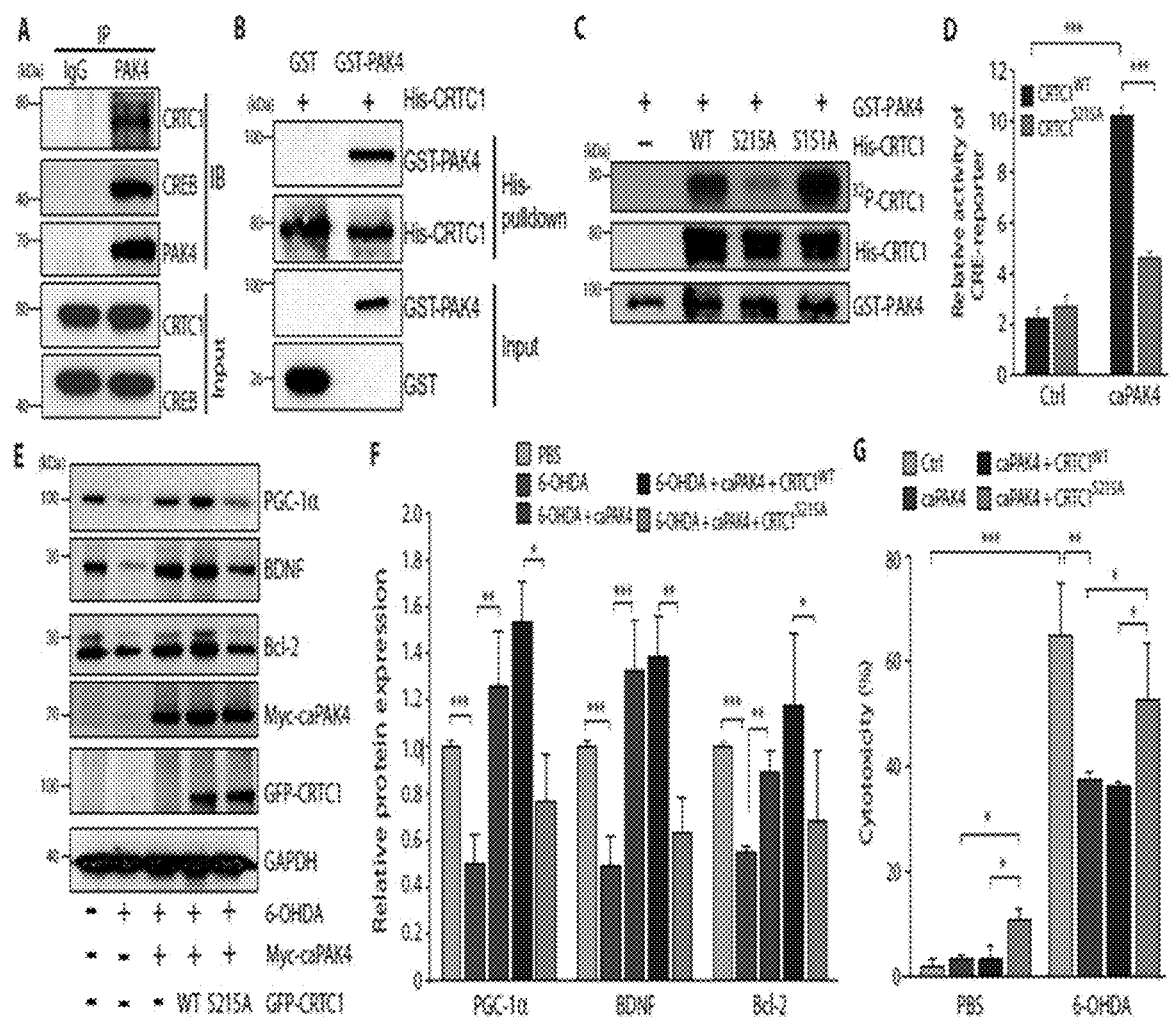
FIG. 10 shows the results of analysis for the effect of phosphorylation at the CRTC1 S215 site on the activity of CREB by PAK4. A represents the relevance of PAK4 with CRTC1 and CREB in SH-SY5Y cells, checked through immunoprecipitation (ip) and immunoblotting (ib). B represents the results of his pull-down. C represents the results of kinase analysis for wild-type and CRTC1 variants, D represents the results of CRE reporter assay in SH-SY5Y cells. E represents the results of immunoblotting for the CREB downstream target factors, PGC-1 alpha, BNDF and Bcl-2, F is the quantification of the results in E. G is the measurement results for the activity of LDH in SH-SY5Y cells.
Figure 11:
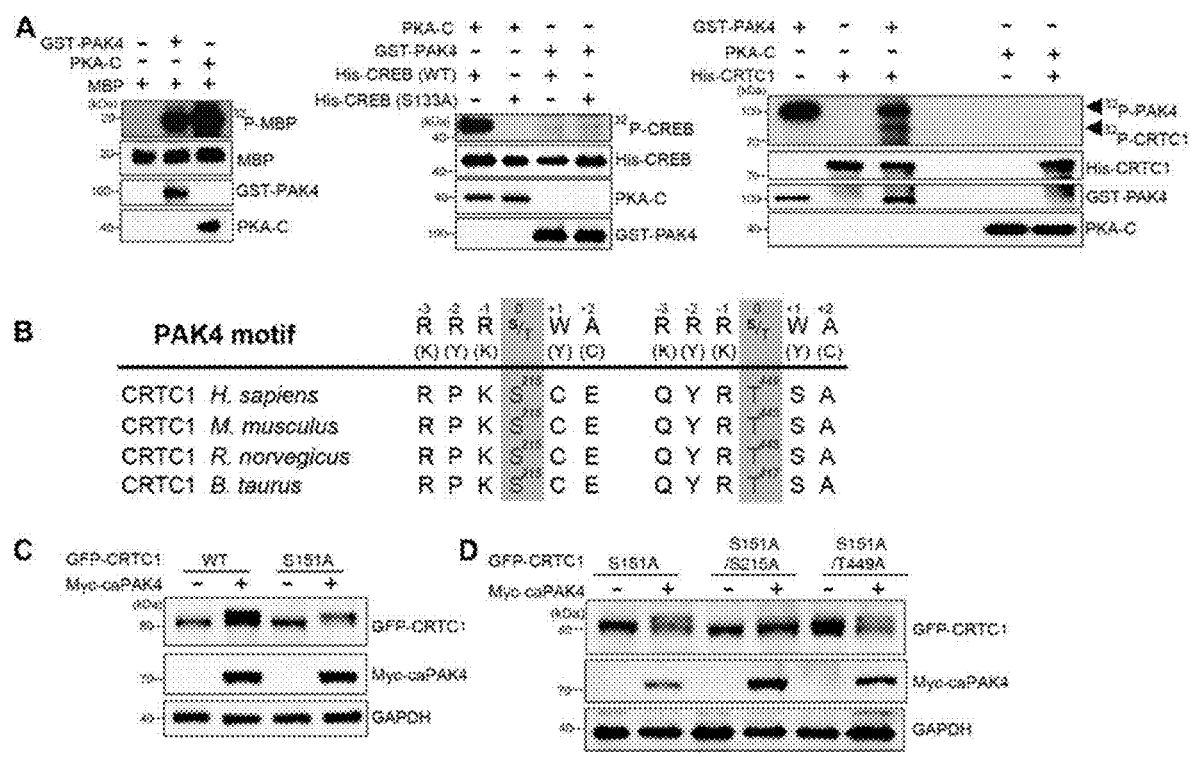
FIG. 11 shows the results where the S215 site at which phosphorylation occurs in CRTC1 was identified. A represents the results of in vitro kinase analysis, showing the results of immunoblotting for substrate proteins phosphorylated by phosphorylation reaction. B represents the results of sequence alignment for CRTC1-derived peptide fragments from human, mouse, rat and cattle (two candidate sites for phosphorylation are shown in red). C and D represent the results where shifts of the CRTC1 variants were checked by electrophoresis.

As a result, as shown in FIG. 10, it has been shown that PAK4 and CRTC1 are directly coupled to each other, CRTC1 is a substrate of caPAK4, and PAK4 phosphorylates CRTC1.

Furthermore, the present inventors identified the site in CRTC1 phosphorylated by PAK4 through sequencing. As a result, it has been shown that among S215 and T449, the S215 site was a site phosphorylated by PAK4.

In order to more clearly identify whether S215 is a phosphorylation site, mutants of CRTC1$^{S215A}$, CRTC1$^{S151A}$, and CRTC1$^{T449A}$, which are unphosphorylatable forms, were prepared and then analyzed for their activity by PAK4. It has been found that CRTC1$^{S151A}$ and CRTC1$^{S151A/T449A}$ were slightly phosphorylated, but. CRTC1$^{S151A/S215A}$ was not phosphorylated. As the same result, it has been found that the active PAK4 recombinant protein phosphorylates CRTC1$^{S215A}$ very strongly. That is, these results mean that the site in CRTC1 phosphorylated by PAK4 is the S215 site, which has been also identified for the first time in the present invention.

Furthermore, in order to more clearly identify the functional role of the S215 site in CRTC1, we allowed caPAK4 to be co-expressed with CRTC1$^{WT}$ or CRTC1$^{S215A}$ and measured CRE reporter activity. As a result, it has been shown that CRTC1$^{S215A}$ strongly suppressed CRE activity due to caPAK4, which is in line with the phenomenon of caPAK4-induced reduced expression of the CREB target proteins, PGC-1a, BDNF, and Bcl-2. Besides, it has been shown that CRTC1$^{S215A}$ decreased the cytoprotective activity of caPAK4 on cytotoxicity caused by 6-OHDA (see FIG. 10).

Therefore, the present inventors have found that phosphorylation at the S215 site in CRTC1 plays a very important role in CREB activity and cytoprotective activity of PAK4.

Figure 12:
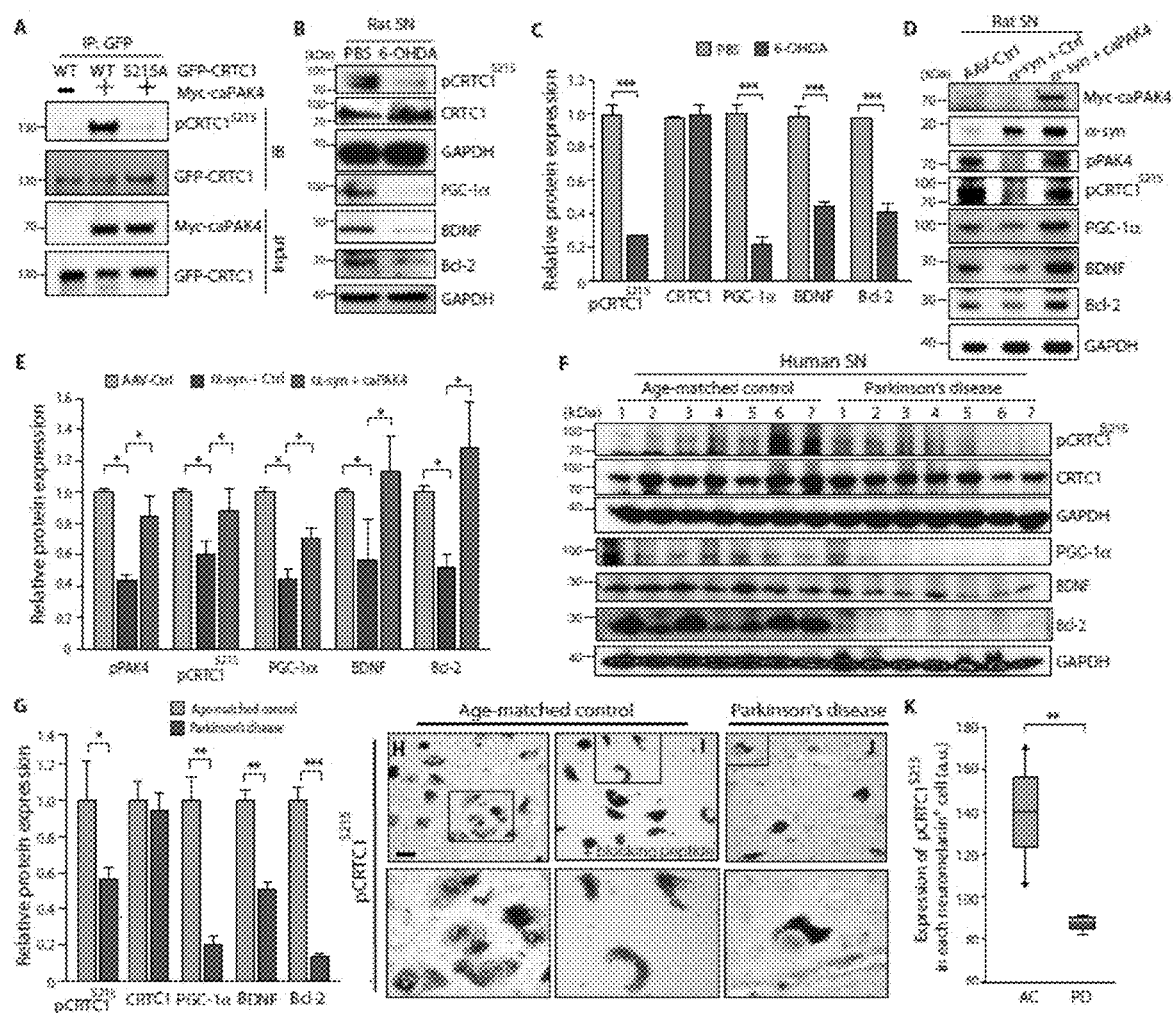
FIG. 12 shows the results of analysis for the effect of CRTC1 S215 phosphorylation on the brain cell protective activity in a rat model of Parkinson's disease. A is the results of immunoblotting after immunoprecipitation through anti-GFP antibody in SH-SY5Y cells. B and D represent the results of immunoblotting for SN lysates derived from mice with Parkinson's disease, and F represents results of immunoblotting for brain tissue proteins derived from patients with Parkinson's disease. C, E and G represent graphs obtained by quantifying the results in B, D and F, respectively. H to K represent pCRTC$^{215}$ identified in the respective samples.

In order to confirm the effect on S215 phosphorylation in CRTC1 in the Parkinson's disease model, antibodies capable of recognizing phospho-CRTC1$^{S215}$ (pCRTC1$^{S215}$) were prepared by the experimental method described above. Then, pCRTC1 was detected for the SN lysate of rats injected with 6-OHDA. As a result, it has been shown that the amount of phosphorylated pCRTC1 was decreased and the expression of CREB target proteins was also decreased. An analysis of CRTC1$^{S215A}$ in the SN for the brain tissues obtained from patients with Parkinson's disease was performed. As a result, it has been shown that CRTC1$^{S215A}$ was reduced in the brain tissue samples with Parkinson's disease compared to the tissue samples that had not developed the disease (see FIG. 12).

From these results, the present inventors have found that active PAK4 (phosphorylated PAK4) phosphorylates the S215 site in CRTC1 and activates CREB to thereby enhance the expression of brain cell protective factors, in a degenerative brain disease such as Parkinson's disease, ultimately leading to amelioration of brain cell damages and protection for brain cells, which enables a degenerative brain disease to be fundamentally prevented, ameliorated and treated.

The present invention has been described above with reference to preferred embodiments thereof. It will be understood by those skilled in the art that the present invention may be embodied in modified forms without departing from its essential characteristics. Therefore, the disclosed embodiments should be considered in an illustrative sense rather than a limiting sense. The scope of the present invention is not defined by the above description but by the claims, and it should be interpreted that all changes which come within the scope equivalent thereto are encompassed by the present invention.

What is claimed is:

1. A method of phosphorylating the serine 215 residue in the CRTC1 (cyclic adenosine 3',5'-monophosphate (cAMP) response element-binding protein (CREB)-regulated transcription coactivator 1) amino acid sequence of SEQ ID NO: 3 in a subject in need thereof, comprising preparing a lentivirus expressing an active mutant in which PAK4 (p21-activated kinase 4) activity is continuously maintained; and administering the lentivirus to the brain of said subject, wherein said subject has Parkinson's disease.

* * * * *

SEQUENCE LISTING

```
Sequence total quantity: 8
SEQ ID NO: 1            moltype = AA  length = 591
FEATURE                 Location/Qualifiers
REGION                  1..591
                        note = PAK4 amino acid sequence
source                  1..591
                        mol_type = protein
                        organism = synthetic construct
SEQUENCE: 1
MFGKRKKRVE ISAPSNFEHR VHTGFDQHEQ KFTGLPRQWQ SLIEESARRP KPLVDPACIT  60
SIQPGAPKTI VRGSKGAKDG ALTLLLDEFE NMSVTRSNSL RRDSPPPPAR ARQENGMPEE 120
PATTARGGPG KAGSRGRFAG HSEAGGGSGD RRRAGPEKRP KSSREGSGGP QESSRDKRPL 180
SGPDVGTPQP AGLASGAKLA AGRPFNTYPR ADTDHPSRGA QGEPHDVAPN GPSAGGLAIP 240
QSSSSSSRPP TRARGAPSPG VLGPHASEPQ LAPPACTPAA PAVPGPPGPR SPQREPQRVS 300
HEQFRAALQL VVDPGDPRSY LDNFIKIGEG STGIVCIATV RSSGKLVAVK KMDLRKQQRR 360
ELLFNEVVIM RDYQHENVVE MYNSYLVGDE LWVVMEFLEG GALTDIVTHT RMNEEQIAAV 420
CLAVLQALSV LHAQGVIHRD IKSDSILLTH DGRVKLSDFG FCAQVSKEVP RRKSLVGTPY 480
WMAPELISRL PYGPEVDIWS LGIMVIEMVD GEPPYFNEPP LKAMKMIRDN LPPRLKNLHK 540
VSPSLKGFLD RLLVRDPAQR ATAAELLKHP FLAKAGPPAS IVPLMRQNRT R          591

SEQ ID NO: 2            moltype = DNA  length = 1776
FEATURE                 Location/Qualifiers
misc_feature            1..1776
                        note = PAK4 DNA sequence
source                  1..1776
                        mol_type = other DNA
                        organism = synthetic construct
SEQUENCE: 2
atgtttggga agaggaagaa gcgggtggag atctccgcgc cgtccaactt cgagcaccgc  60
gtgcacacgg gcttcgacca gcacgagcag aagttcacgg ggctgccccg ccagtggcag 120
agcctgatcg aggagtcggc tcgccggccc aagcccctcg tcgaccccgc ctgcatcacc 180
tccatccagc ccggggcccc caagaccatc gtgcggggca gcaaaggtgc caaagatggg 240
gccctcacgc tgctgctgga cgagtttgag aacatgtcgg tgacacgctc caactccctg 300
```

```
cggagagaca   gcccgccgcc   gcccgcccgt   gcccgccagg   aaaatgggat   gccagaggag    360
ccggccacca   cggccagagg   gggcccaggg   aaggcaggca   gccgaggccg   gttcgccggt    420
cacagcgagg   caggtggcgg   cagtggtgac   aggcgacggg   cggggccaga   gaagaggccc    480
aagtcttcca   gggagggctc   aggggtccc   caggagtcct   cccgggacaa   cgcccctc     540
tccgggcctg   atgtcggcac   ccccagcct   gctggtctgg   ccagtggggc   gaaactggca    600
gctggccggc   cctttaacac   ctacccgagg   gctgacacgg   accacccatc   ccggggtgcc    660
caggggggagc   ctcatgacgt   ggcccctaac   gggccatcag   cggggggcct   ggccatcccc   720
cagtcctcct   cctcctcctc   ccggcctccc   acccgagccc   gaggtgcccc   cagccctgga    780
gtgctgggac   cccacgcctc   agagcccag   ctggcccctc   cagcctgcac   cccgccgcc    840
cctgctgttc   ctgggcccc   tggcccccgc   tcaccacagc   gggagccaca   gcgagtatcc    900
catgagcagt   tccgggctgc   cctgcagctg   tgtggtggacc   caggcgaccc   ccgctcctac   960
ctggacaact   tcatcaagat   tggcgagggc   tccacgggca   tcgtgtgcat   cgccaccgtg   1020
cgcagctcgg   gcaagctggt   ggccgtcaag   aagatgacc   tgcgcaagca   gcagaggcgc   1080
gagctgctct   tcaacgaggt   ggtaatcatg   agggactacc   agcacgagaa   tgtggtggag   1140
atgtacaaca   gctaccggt   gggggacgag   ctctggggtgg   tcatggagtt   cctgaaggga   1200
ggcgccctca   ccgacatcgt   cacccacacc   aggatgaacg   aggagcagat   cgcagccgtg   1260
tgccttgcag   tgctgcaggc   cctgtcggtg   tccacgccc   agggcgtcat   ccaccgggac   1320
atcaagacg   actcgatcct   gctgacccat   gatggcaggg   tgaagctgtc   agactttgag   1380
ttctgcgccc   aggtgagcaa   ggaagtgccc   cgaaggaagt   cgctggtcgg   cacgccctac   1440
tggatggccc   cagagctcat   ctcccgcctt   ccctacgggc   cagaggtaga   catctggtcg   1500
ctggggataa   tggtgattga   gatggtggac   ggagagcccc   cctacttcaa   cgagccaccc   1560
ctcaaagcca   tgaagatgat   tcgggacaac   ctgccacccc   gactgaagaa   cctgcacaag   1620
gtgtcgccat   ccctgaaggg   cttcctggac   cgcctgctgg   tgcgagaccc   tgcccagcgg   1680
gccacggcag   ccgagctgct   gaagcaccca   ttcctggcca   aggcagggcc   gcctgccagc   1740
atcgtgcccc   tcatgcgcca   gaaccgcacc   agatga                                 1776

SEQ ID NO: 3         moltype = AA   length = 634
FEATURE              Location/Qualifiers
REGION               1..634
                     note = CRTC1 amino acid sequence
source               1..634
                     mol_type = protein
                     organism = synthetic construct
SEQUENCE: 3
MATSNNPRKF SEKIALHNQK QAEETAAFEE VMKDLSLTRA ARLQLQKSQY LQLGPSRGQY    60
YGGSLPNVNQ IGSGTMDLPF QTPFQSSGLD TSRTTRHHGL VDRVYRERGR LGSPHRRPLS   120
VDKHGRQADS CPYGTMYLSP PADTSWRRTN SDSALHQSTM TPTQPESFSS GSQDVHQKRV   180
LLLTVPGMEE TTSEADKNLS KQAWDTKKTG SRPKSCEVPG INIFPSADQE NTTALIPATH   240
NTGGSLPDLT NIHFPSPLPT PLDPEEPTFP ALSSSSSTGN LAANLTHLGI GGAGQGMSTP   300
GSSPQHRPAG VSPLSLSTEA RRQQASPTLS PLSPITQAVA MDALSLEQQL PYAFFTQAGS   360
QQPPPQPQPP PPPPPASQQP PPPPPPQAPV RLPPGGPLLP SASLTRGPQP PPLAVTVPSS   420
LPQSPPENPG QPSMGIDIAS APALQQYRTS AGSPANQSPT SPVSNQGFSP GSSPQHTSTL   480
GSVFGDAYYE QQMAARQANA LSHQLEQFNM MENAISSSSL YSPGSTLNYS QAAMMGLTGS   540
HGSLPDSQQL GYASHSGIPN IILTVTGESP PSLSKELTSS LAGVGDVSFD SDSQFPLDEL   600
KIDPLTLDGL HMLNDPDMVL ADPATEDTFR MDRL                              634

SEQ ID NO: 4         moltype = DNA   length = 1905
FEATURE              Location/Qualifiers
misc_feature         1..1905
                     note = CRTC1 DNA sequence
source               1..1905
                     mol_type = other DNA
                     organism = synthetic construct
SEQUENCE: 4
atggcgactt   cgaacaatcc   gcggaaattc   agcgagaaga   tcgcgctgca   caatcagaag     60
caggcggagg   agacggcggc   cttcgaggag   gtcatgaagg   acctgagcct   gacgcgggcc    120
gcgcggctcc   agctccagaa   atcccagtac   ctgcaactgg   gccccagccg   aggccagtac    180
tatggcgggt   ccctgcccaa   cgtgaaccag   atcgggagtg   gcaccatgga   cctgcccttc    240
cagaccccct   tccaatcctc   gggcctggac   accagccgga   ccacccggca   ccatgggctg    300
gtggacaggg   tgtaccggga   gcgtggccgg   ctcggctccc   cacaccgccg   gcccctgtca    360
gtggacaaac   acggacggca   ggccgacagc   tgcccctatg   gcaccatgta   cctctctcca    420
cccgcggaca   ccagctggag   aaggaccaat   tctgactccg   ccctgcacca   gagcacaatg    480
acgcccacgc   agccagaatc   ctttagcagt   gggtcccagg   acgtgcacca   gaaaagagtc    540
ttactgttaa   cagtcccagg   aatggaagag   accacatgga   agcagacaa   aaacctttcc    600
aagcaagcat   gggacaccaa   gaagacgggg   tccaggccca   gtcctgtga   ggtccccgga     660
atcaacatct   tcccgtctgc   cgaccaggaa   aacactacag   ccctgatccc   cgccacccac    720
aacacagggg   ggtccctgcc   cgacctgacc   aacatccact   tccctccc   gctcccgacc    780
ccgctggacc   cggaggagcc   caccttccct   gcactgagca   gctccagcag   caccggcaac    840
ctcgcggcca   acctgacgca   cctgggcatc   ggtggccgg   gccagggaat   gagcacacct    900
ggctcctctc   cacagcaccg   cccagctggc   gtcagccccc   tgtccctgag   cacagaggca    960
aggcgtcagc   aggcatcgcc   caccctgtcc   ccgctgtcac   catcactca   ggctgtagcc   1020
atggacgccc   tgtctctgga   gcagcagctg   ccctacgcct   tcttcaccca   ggcgggctcc   1080
cagcagccac   cgccgcagcc   ccagccccg   ccgcctcctc   cacccgcgtc   cagcagcca   1140
ccaccccca   caccccaca   ggccccgtc   cgcctgccgt   ctggtggccc   cctgttgccc   1200
agcgccagcc   tgactcgtgg   gccacagccg   ccccgcttg   cagtcacggt   accgtcctct   1260
ctccccagt   cccccaga   gaaccctggc   cagcatcga   tgggatcga   catcgcctcg   1320
gcgcggctc   tgcagcagta   ccgcactagc   gccggctccc   cggccaacca   gtctcccacc   1380
tcgccagtct   ccaatcaagg   cttctccca   gggagctccc   gcaacacac   ttccaccctg   1440
ggcagcgtgt   ttggggacgc   gtactatgag   cagcagatgg   cggccaggca   ggccaatgct   1500
```

```
ctgtcccacc agctggagca gttcaacatg atggagaacg ccatcagctc cagcagcctg    1560
tacagcccgg gctccacact caactactcg caggcggcca tgatgggcct cacgggcagc    1620
cacgggagcc tgccggactc gcagcaactg ggatacgcca gccacagtgg catccccaac    1680
atcatcctca cagtgacagg agagtccccc cccagcctct ctaaagaact gaccagctct    1740
ctggccgggg tcggcgacgt cagcttcgac tccgacagcc agtttcccct ggacgaactc    1800
aagatcgacc ccctgaccct cgacggactg cacatgctca acgacccccga catggttctg    1860
gccgacccag ccaccgagga caccttccgg atggaccgcc tgtga                    1905

SEQ ID NO: 5             moltype = DNA  length = 19
FEATURE                  Location/Qualifiers
misc_feature             1..19
                         note = SH-082018-01 sequence
source                   1..19
                         mol_type = other DNA
                         organism = synthetic construct
SEQUENCE: 5
ttacgcaagt ccatcttct                                                 19

SEQ ID NO: 6             moltype = DNA  length = 19
FEATURE                  Location/Qualifiers
misc_feature             1..19
                         note = SH-082018-02 sequence
source                   1..19
                         mol_type = other DNA
                         organism = synthetic construct
SEQUENCE: 6
tgatcgaagc ctgtgtgta                                                 19

SEQ ID NO: 7             moltype = DNA  length = 19
FEATURE                  Location/Qualifiers
misc_feature             1..19
                         note = SH-111776-01 sequence
source                   1..19
                         mol_type = other DNA
                         organism = synthetic construct
SEQUENCE: 7
cacgatatac tctgtccac                                                 19

SEQ ID NO: 8             moltype = DNA  length = 19
FEATURE                  Location/Qualifiers
misc_feature             1..19
                         note = SH-111776-02 sequence
source                   1..19
                         mol_type = other DNA
                         organism = synthetic construct
SEQUENCE: 8
tcgctaaatt tccgcggat                                                 19
```